United States Patent [19]

Baer et al.

[11] 4,359,223
[45] Nov. 16, 1982

[54] INTERACTIVE VIDEO PLAYBACK SYSTEM

[75] Inventors: Ralph H. Baer, Manchester; Leonard D. Cope, Merrimack, both of N.H.

[73] Assignee: Sanders Associates, Inc., Nashua, N.H.

[21] Appl. No.: 90,830

[22] Filed: Nov. 1, 1979

[51] Int. Cl.³ .............................................. A63F 9/22
[52] U.S. Cl. .................................. 273/85 G; 273/312; 273/313; 273/DIG. 28; 434/22
[58] Field of Search ............... 273/DIG. 28; 434/307, 434/323, 21–22; 340/723–726; 360/33, 35, 37, 10

[56] References Cited

U.S. PATENT DOCUMENTS

| | | | |
|---|---|---|---|
| 3,697,678 | 10/1972 | Belleson | 360/33 |
| 3,742,289 | 6/1973 | Koeijmans | 364/900 |
| 3,760,375 | 9/1973 | Irwin | 364/200 |
| 3,778,058 | 12/1973 | Rausch | 273/85 G |
| 3,874,669 | 4/1975 | Ariano et al. | 273/85 G |
| 3,900,887 | 8/1975 | Soga et al. | 360/18 |
| 3,921,161 | 11/1975 | Baer | 273/85 G X |
| 3,973,244 | 8/1976 | Lovercheck et al. | 364/200 |
| 3,987,484 | 10/1976 | Bosche et al. | 434/307 |
| 4,026,555 | 5/1977 | Kirschner et al. | 273/85 G |
| 4,032,897 | 6/1977 | Pooley | 364/900 |
| 4,045,789 | 8/1977 | Bristow | 273/DIG. 28 |
| 4,094,079 | 6/1978 | Dorsett | 434/307 |
| 4,126,851 | 11/1978 | Okor | 273/237 X |
| 4,156,928 | 5/1979 | Inose et al. | 273/85 G |
| 4,177,462 | 12/1979 | Chung | 273/85 G |

Primary Examiner—Vance Y. Hum
Attorney, Agent, or Firm—Louis Etlinger; Richard I. Seligman

[57] ABSTRACT

Video images derived from a video recording medium (such as a video disc or tape) using a video playback unit are displayed on the screen of a cathode ray tube display simultaneously with video images generated from a microprocessor-controlled video game. The video game permits a user to manually control the position of some of the generated video images displayed. Signals in the horizontal interval portion of each field from the video playback unit are related to the video images in the pictorial portion of each such field and identify certain characteristics of the video images such as the location of the video images. This information is used in such a manner that the video images from the video playback unit can interact with the video images from the video game.

20 Claims, 12 Drawing Figures

| | |
|---|---|
| A ⟷ | INTERRUPT OF TYPE A, TVI INTERRUPT, COMPLETION OF DISPLAY UPDATE |
| B ⟷ | INTERRUPT OF TYPE B, USART INTERRUPT, RECEPTION OF DATA WORD |
| C ⟷ | INTERRUPT OF TYPE C, FIELD INTERRUPT; OCCURS ONCE EACH 16.7 msec. |
| DSPFLG | DISPLAY FLAG<br>∅ = DISPLAY IS BUSY<br>1 = DISPLAY IS NOT BUSY |
| GFLAG | GATE FLAG<br>1 = REQUEST TO GENERATE BUMPER TYPE C<br>∅ = NO REQUEST TO GENERATE BUMPER TYPE C |
| TST | TEST SWITCH<br>1 = TEST<br>∅ = NO TEST |
| TVI | TELEVISION INTERFACE |
| USART | UNIVERSAL SYNCHRONOUS/ASYNCHRONOUS RECEIVER/TRANSMITTER |
| RST | GAME RESET<br>1 = RESET<br>∅ = NO RESET |
| BALLS | NUMBER OF BALLS LEFT TO PLAY. |

FIG. 8A.

INTERACTIVE VIDEO PLAYBACK SYSTEM

BACKGROUND OF THE INVENTION

U.S. Pat. No. 4,034,990, assigned to the assignee of the present application, relates to a technique for allowing interaction between symbols from signals recorded on a video medium (such as a video tape or disc) and regenerated by a video playback unit and symbols from a video game unit whereby the symbols from the video playback unit and the game unit are both dislayed on the screen of a cathode ray tube (CRT) display. The signals derived from the video playback unit are of such characteristic that data can be generated from them to identify, for example, where on the screen of the CRT the symbols from the video playback unit are, and, thus, permit the symbols from the game unit to interact with the symbols from the video playback unit.

In one embodiment described in the aforementioned patent, the video signals from the video playback unit which generate the symbols on the CRT display are coded by being generated at a maximum white level and decoded in the game unit by identifying signals of such maximum white level. The decoded signals can then be used to develop logic level signals which are time related to the symbol locations on the CRT screen and, thus, the logic signals can be used to indicate such things as coincidence between a signal generated from the video playback unit and signals generated by the game unit.

While this technique is adequate for many applications, it does have its drawbacks. The amount of data which can be encoded by such level identification is small.

Accordingly, it is an object of this invention to provide an improved interactive video playback unit system.

SUMMARY OF THE INVENTION

The present invention has wide application in various systems wherein symbols derived from a video tape or disc are displayed on the screen of a cathode ray tube display in conjunction with symbols from other apparatus and wherein interaction between the symbols from the two sources are to be provided. The principles of this invention are, thus, useful in video games, in various teaching and training applications, etc. The principles of the invention will be described as related to a simulated pinball game; however, the scope of the invention and the uses therefor are much greater and the pinball application is merely used for tutorial purposes.

In a simulated pinball game, a video playback unit can provide colorful background for the playing field surface as well as game components; such as bumpers, typically found on standard pinball machines. The video playback unit is used in conjunction with a microprocessor-controlled video game which provides other symbology as well as controls to be operated by the players. Microprocessor-controlled video games are well known in the art. In this embodiment the video game supplies symbology representing flippers, a ball, certain bumpers and numerical scoring presentations. During the process of the simulated pinball game the ball interacts with the bumpers, including those provided by the video playback unit.

The video disc or tape employed with the video playback unit has data bits embedded in the horizontal retrace interval portion of each line of each field of the recorded signal. Such digital data bits are required to identify the coordinates of one or more of the objects or symbols contained in the pictorial portion of the particular field. Thus the set of digital data, or instructions, embedded in one or more horizontal intervals is associated with the video signal on a field-by-field basis. Knowledge of this data is required by the game microprocessor to enable it to control interaction between an internally generated symbol and a video tape or disc pictorial symbol simultaneously shown on the screen.

BRIEF DESCRIPTION OF THE DRAWINGS

The above-mentioned and other features and objects of this invention will become more apparent by reference to the following description taken in conjunction with the accompanying drawings, in which:

FIGS. 8A–8E is a flow chart for the pinball game described herein.

DESCRIPTION OF A PREFERRED EMBODIMENT

Figure 1:
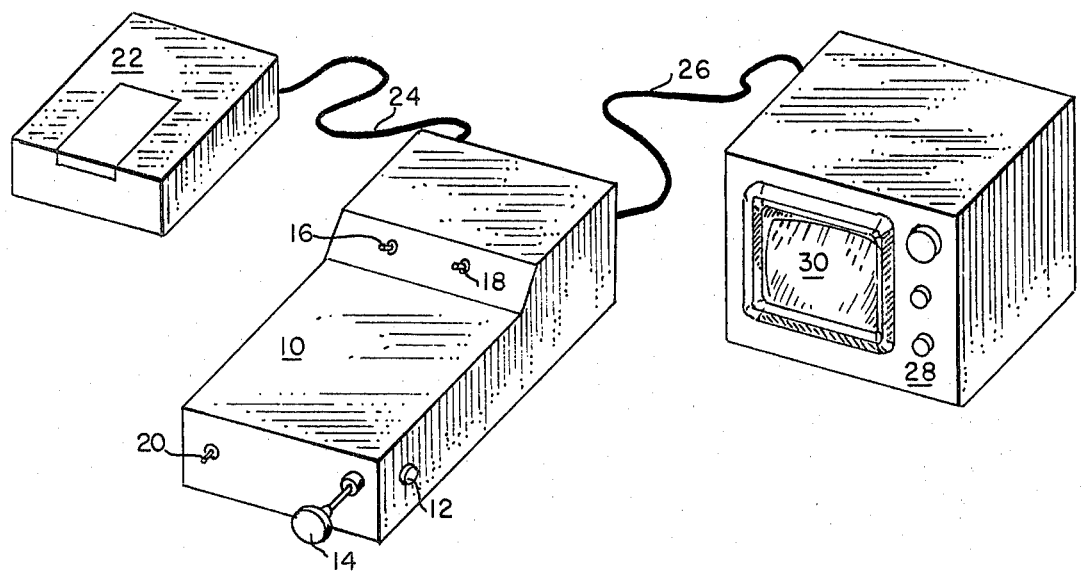
FIG. 1 is a pictorial view illustrating the major components of an interactive video playback system.

Referring now to FIG. 1 of the drawings, there is illustrated thereby a pictorial view of an interactive video playback system configured according to the principles of the invention. The invention has broad application in the fields of games, training and the like; however, the principles thereof will be described in conjunction with a pinball type game and the particular elements pertinent to that game are described for the system.

The system includes a microprocessor-controlled video game unit or game generator 10 which includes two flipper buttons 12 (left and right) to control flippers in a manner simulating flippers in a conventional pinball game. Microprocessor-controlled game unit 10 further includes a ball launch switch 14 which launches a ball to the pinball game simulating the inputting of a ball onto the surface of a conventional electromechanical pinball type game. The microprocessor-controlled game unit also includes a system reset switch 16, a timing reset switch 18 and a game reset switch 20.

The system also includes a video tape recorder 22; however, a disc playback unit or any other suitable medium can be substituted therefor. Alternatively, the information normally supplied from the video tape recorder may be received from a television broadcast or cablecast system. The output from the tape recorder 22 is coupled by a cable 24 to the microprocessor-controlled game unit 10. A cable 26 couples the game unit 10 to a display 28 which is preferably a conventional broadcast television receiver or monitor.

Figure 2:
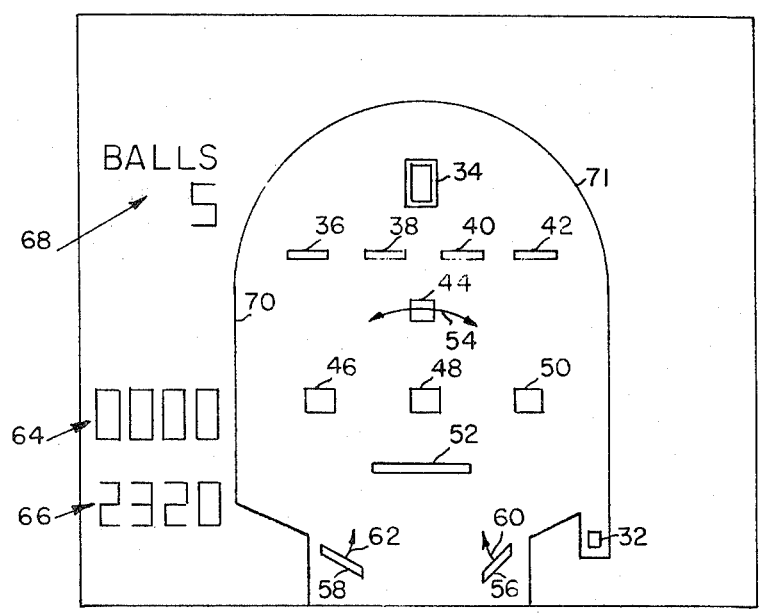
FIG. 2 is a diagram of the screen of the display of the system of FIG. 1.

Shown on the screen 30 of the display 28 would be the various symbols representing the elements of a pinball game and a colorful background. FIG. 2 illustrates the symbols displayed on screen 30 for the embodiment described herein, including a ball symbol 32 which is launched on to the playing field by actuating the ball launch control 14 such that the ball enters the screen moving to the top thereof in the manner of a conventional pinball game. The other symbology on the screen 30 includes bumpers 34, 36, 38, 40, 42, 44, 46, 48, 50, and 52. Bumper 34 has the appearance of a numeral (in the figure the number 0). However, during the playing of a game the number displayed changes. Each time the bumper 34 is hit by ball 32 it changes by increasing in value by 1 until the number 9 is displayed. Thus, the first time bumper 34 is struck by ball 32 it will change from zero to a one, the next time it is hit it will change from 1 to 2, etc. Bumpers 34, 36, 38, 40, 42, 46, 48, 50 and 52 are stationary bumpers while bumper 44 oscillates as indicated by the arrows 54.

Also displayed on screen 30 are a pair of flippers 56, 58 which move as shown by the arrows 60, 62. The flippers are actuated by depressing the switches 12.

The other symbology displayed on screen 30 are alphanumerics including: the score 64 of the present game, the score 66 achieved during the last game played and the number of balls 68 remaining to be played during a game. The wall or boundaries 70 of the simulated pinball table field are also displayed.

In this embodiment all of the symbology shown on the screen 30 is generated by the game generator 10 except for the symbols representing bumpers 44, 46, 48 and 50 and the boundaries or walls 70 of the playing field; however, this is exemplary only and other symbols now supplied by the game generator could be supplied by the video tape recorder and vice versa.

During the playing of a game, actuating the ball launch mechanism 14 causes a ball 32 to be launched to the top of the playing area. As the ball moves through the playing area and collides with a bumper, scoring is achieved. If the ball hits bumper 34, the player scores ten times the value of the bumper and the bumper is then incremented by one. Hitting bumpers 36, 38, 40, 42 or 52 scores ten points and results in a wipe-out of the part of the bumper that was hit. Hitting any of bumpers 44, 46, 48 or 50 also scores ten points.

The flippers 56, 58, when actuated by flipper controls 12 are used to keep the ball in play, that is, to "hit" the ball up when it nears the bottom of the playing field.

The ball 32 also rebounds off certain of the bumpers when coincident therewith and also rebounds from the walls 70 when coincident therewith.

Figure 3:
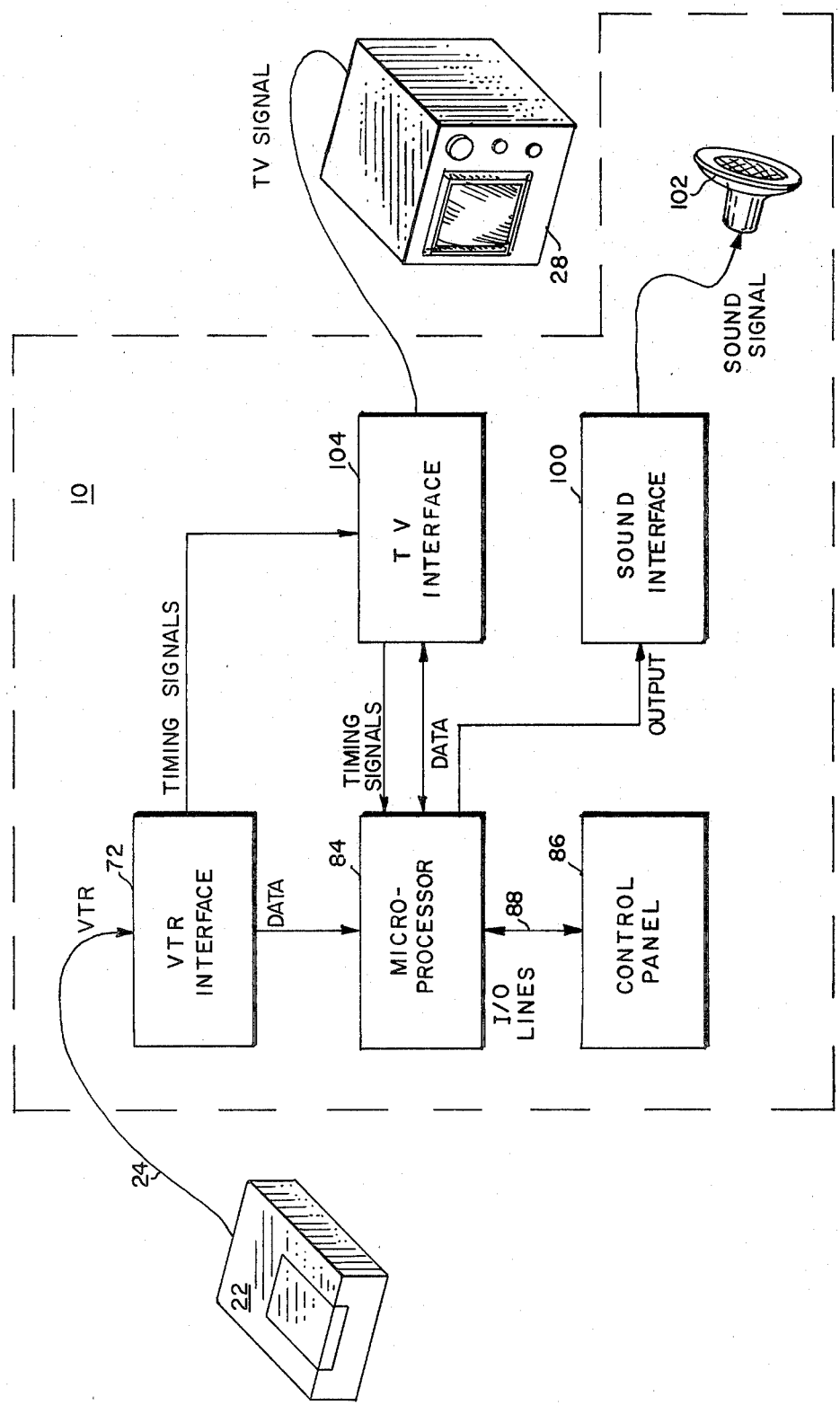
FIG. 3 is a block diagram of the system of FIG. 1.

FIG. 3 of the drawings illustrates a block diagram of the video playback system and includes video tape recorder 22, microprocessor-controlled video game unit 10 and display 28. The output from the video tape recorder 22 is supplied by cable 24 to the microprocessor-controlled video game unit 10. This output includes composite video and synchronization signals recorded on the video tape, and includes in the video or pictorial field of the tape video signals representing bumpers 44, 46, 48 and 50 and wall 70. These bumpers are recorded on the video tape by way of example, by pointing the camera at an entire (or portion of a) "real" pinball machine or portions of models thereof. The video field can also contain a suitable picture for background as in conventional pinball machines.

The information from the video tape playback unit also includes digital data. The digital data in this embodiment trails the horizontal synchronization signals such that data may be provided in many of the horizontal lines of the field. The data is located sufficiently close to the blanking signals such that unintended display will not occur on the screen 30. In a color system these digital data signals will generally follow the chroma burst. Alternatively, the digital data may be provided in the vertical interval; that is, following color burst in the first 20 to 25 horizontal lines during vertical interval which are not shown in the screen due to vertical blanking and receiver overscan.

While in the embodiment described herein the digital data is located close to the blanking signals so as to preclude unintended display on the screen, it is not necessary to do so. In fact if larger amounts of data were to be provided per field, it can be done by nesting or inserting "1"s and "0"s along one or more entire horizontal lines and even on all lines of an entire field. This can be done without affecting the display since it is under microprocessor control and the microprocessor can blank the display in each area data is located. For certain applications, a large amount of data would be dumped and the microprocessor could turn off the incoming video altogether for a short period sufficient to dump the data.

The digital data in each field relates to the images from the field to be displayed on the television receiver. In the embodiment illustrated, wherein the information from the video playback unit provides the bumpers 44, 46, 48 and 50 and the wall 70, the digital data in the horizontal interval will provide to the microprocessor information concerning the location of those particular bumpers and the wall so that any signals generated in the microprocessor-controlled video game unit can interact with the signals representing the bumpers and wall. For example, the microprocessor is continually apprised of where on the screen ball 32 is located, it being generated by the game unit 10. The microprocessor also is apprised of where the bumpers 44–50 and wall 70 are located from the digital data received from the video tape recorder. The microprocessor knows the location of the ball and the location of the bumper or wall. It, thus, may determine that the ball has in fact touched the bumper or wall, and can process instructions to move the ball accordingly. For example, the microprocessor might cause the bumper to hold the ball for some length of time and then cause the ball to rebound upward or in some other direction, in the manner of a regular electromechanical pinball game. An important feature of the invention is, thus, that the digital data contained on video tape in the horizontal and/or vertical interval relates to the video signal on the same field of the visual or pictorial portion of the television scan.

Figure 4:
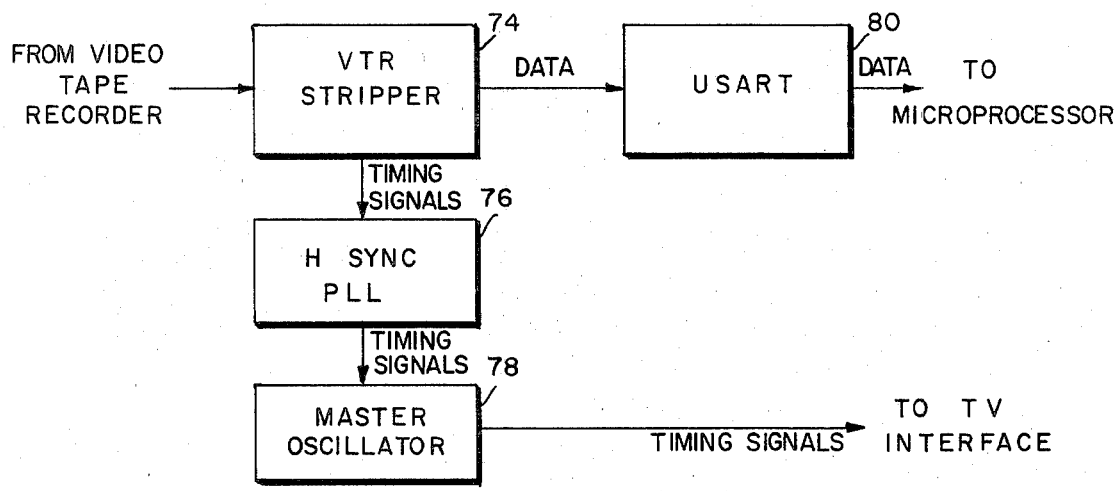
FIG. 4 is a block diagram of the video tape recorder interface employed in the system of FIG. 3.

The entire signal from the video tape recorder, including the video signal representing objects for display on the screen 30 of display 28, the synchronization signals, and the digital data nested in the horizontal interval during and/or after vertical interval, is applied via line 24 to a video tape recorder (VTR) interface 72 which is illustrated in greater detail in FIG. 4.

The VTR interface monitors the signals emanating from the video tape recorder 22 and includes a VTR stripper 74, a horizontal sync phase-locked loop 76, a master oscillator 78 and a universal synchronous/asynchronous receiver transmitter (USART) 80.

In the specific embodiment of the invention described herein, one data bit has been stored on every other raster line of the video tape. This has been done due to speed limitations of the USART. However, new devices coming onto the market allow faster speeds which permit a data bit to be encoded onto each raster line.

Data is received from the video tape recorder 22 asynchronously. A data word is composed of a start bit, eight bits of data and one stop bit. Television sets have a horizontal raster line rate of 15.734 KHz. Since ten bit are required for each data word, the baud rate is 786 words per second. Upon receipt of a data word, the VTR interface signals the microprocessor of the event.

The VTR stripper 74 extracts sync and data signals from the signal from the video tape recorder, applying the data to the USART and the horizontal synchronous signals to the horizontal sync phase-locked loop 76 which outputs a signal to the master oscillator 78.

Referring again to FIG. 3, the game generator includes a microprocessor 84 and a control panel 86. The control panel in this embodiment includes the switches 12, 14, 16 and 20 of FIG. 1. The control panel 86 generates control data along line 88 which is applied to the microprocessor 84.

Figure 5:
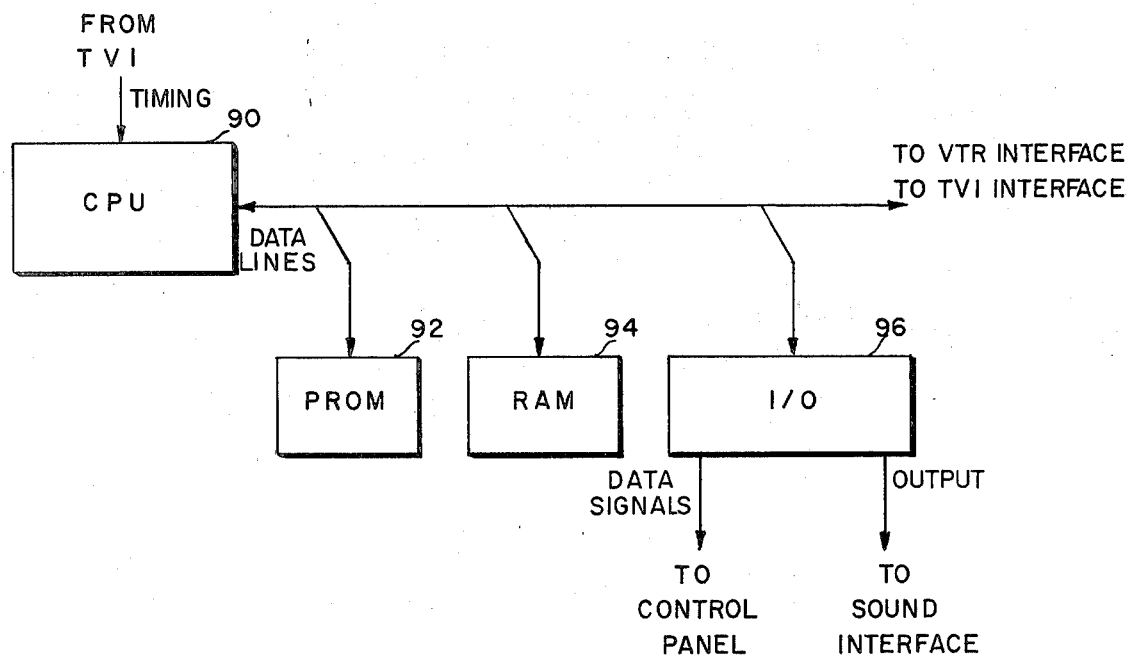
FIG. 5 is a block diagram of the microprocessor employed in the system of FIG. 3.

The microprocessor in this embodiment is an Intel 8085 and is shown in greater detail in FIG. 5. It comprises a central processing unit (CPU) 90, a programmable read-only memory 92, a random access memory (RAM) and an I/O port 96. This configuration is standard. The rules of the game are stored in PROM 92 and the RAM 94 is used as a scratch pad memory. I/O port 96 provides signals to the control panel and to a sound interface 100 (see FIG. 3).

The sound interface circuit 100 transforms the logic signals applied thereto from the microprocessor to audio frequency signals compatible with a loudspeaker 102 simulating the sounds of a "real" pinball game in a manner similar to standard microprocessor video game techniques.

Figure 6:
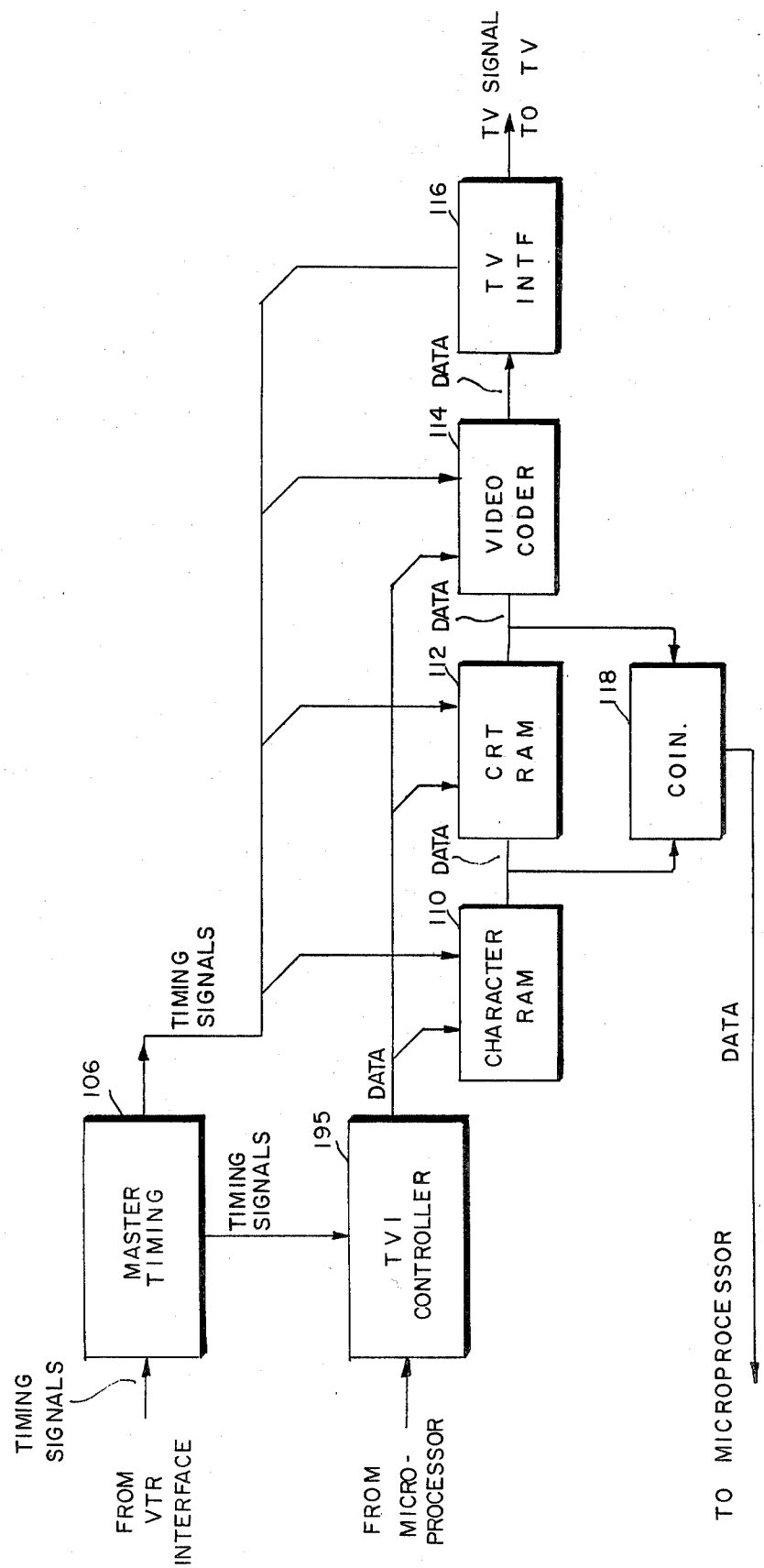
FIG. 6 is a block diagram of the TV interface employed in the system of FIG. 3.

The game generator also includes a TV interface 104 (shown in detail in FIG. 6) which interfaces the other components of the system with the cathode ray tube display 28 to generate a video display. Timing signals from the VTR interface are processed by a master timing circuit 106. A TVI controller 108 (shown in detail in FIG. 7 and to be described hereinafter) is used to act as an interface between the microprocessor and the RAM's of the TV interface. Thus, the TVI controller buffers the data bus of the microprocessor from that of the TVI. Because of this buffer, the TVI may access its own RAM while the microprocessor is also accessing its RAM. The TVI also includes a character RAM 110, CRT RAM 112, video coder 114, monitor interface 116 and a coincidence circuit 118. Dynamic RAM's are used in the CRT RAM to implement a RAM intensive display. The CRT RAM is configured so that it maps the desired CRT display. Characters to be displayed are loaded from the microprocessor into the character RAM 110 by the TVI controller 108. Thereafter, for each character to be displayed, the Cartesian coordinate of the character is loaded into the TVI controller by the microprocessor. The microprocessor then enables the transfer of the character from the character RAM to the CRT RAM. The TVI controller effects the transfer. The video coder 114 is used to latch the contents of the CRT RAM so that the signals sent to the monitor interface 116 will be free of discontinuities. These discontinuities exist because of the nature of the dynamic RAM's used in the CRT RAM. These signals are combined with synchronization signals and a chroma burst so that the signal sent to the television monitor will be of the proper form. Coincidence circuitry 118 is used to monitor the transfer of data from the character RAM to the CRT RAM. If a character is overwritten onto another, coincidence is detected.

Figure 7:
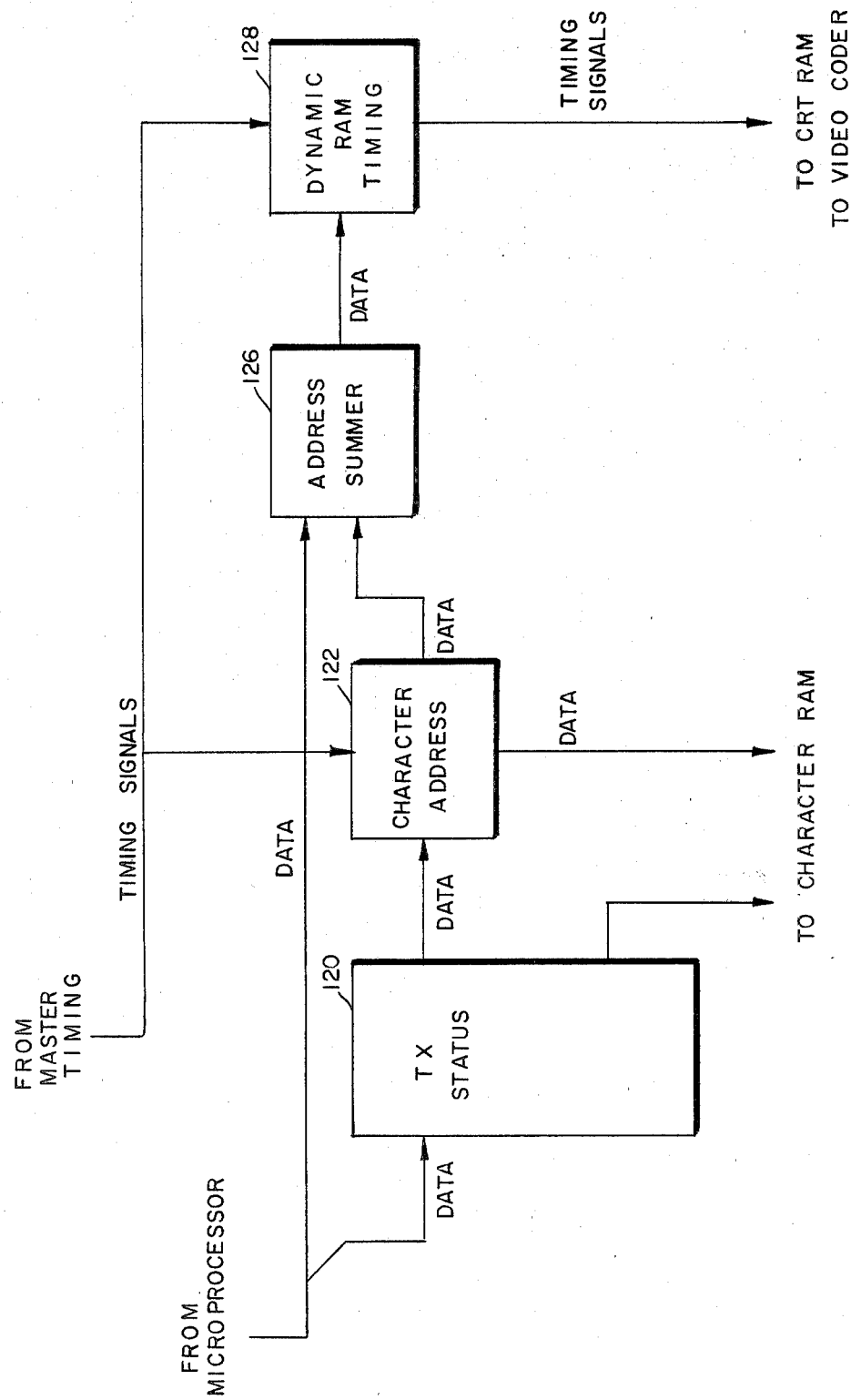
FIG. 7 is a block diagram of the TVI controller employed in the TV interface of FIG. 6.

The TVI controller is shown in detail in FIG. 7. The circuitry TX status 120 is an output port for the microprocessor. Signals emanate from the port and sequence the various functions of the TVI. A character address circuit 122 contains row and column coordinates of an element of a character that is being accessed in the character RAM. An address summer 126 performs the addition of the cartesian coordinates of the location of a character and the contents of the character address. The resultant address is the location to which a character element must be written. Dynamic RAM Timing circuitry 128 generates the addresses necessary for the mapping of the CRT RAM to the CRT.

Figure 8B:
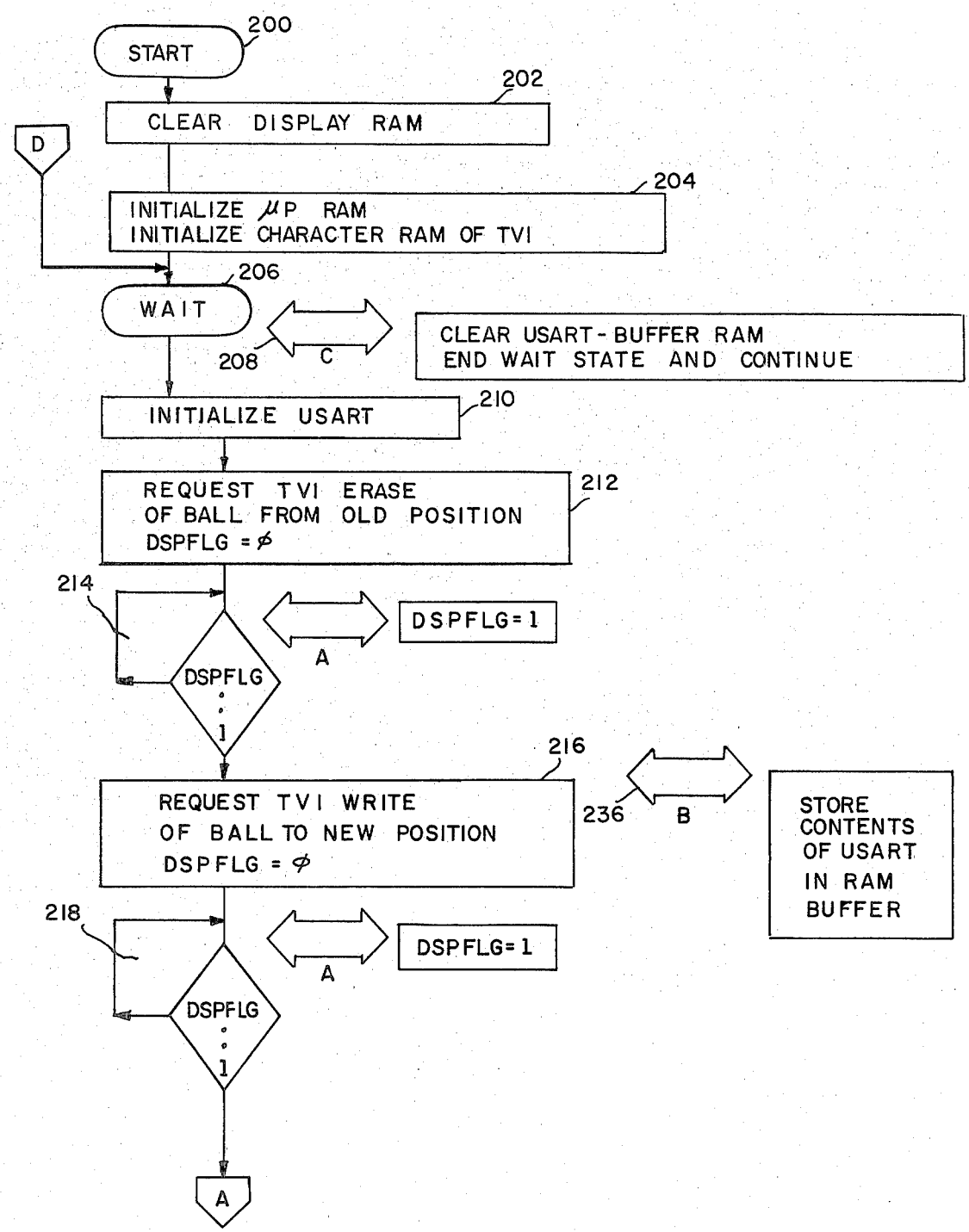
Figure 8C:
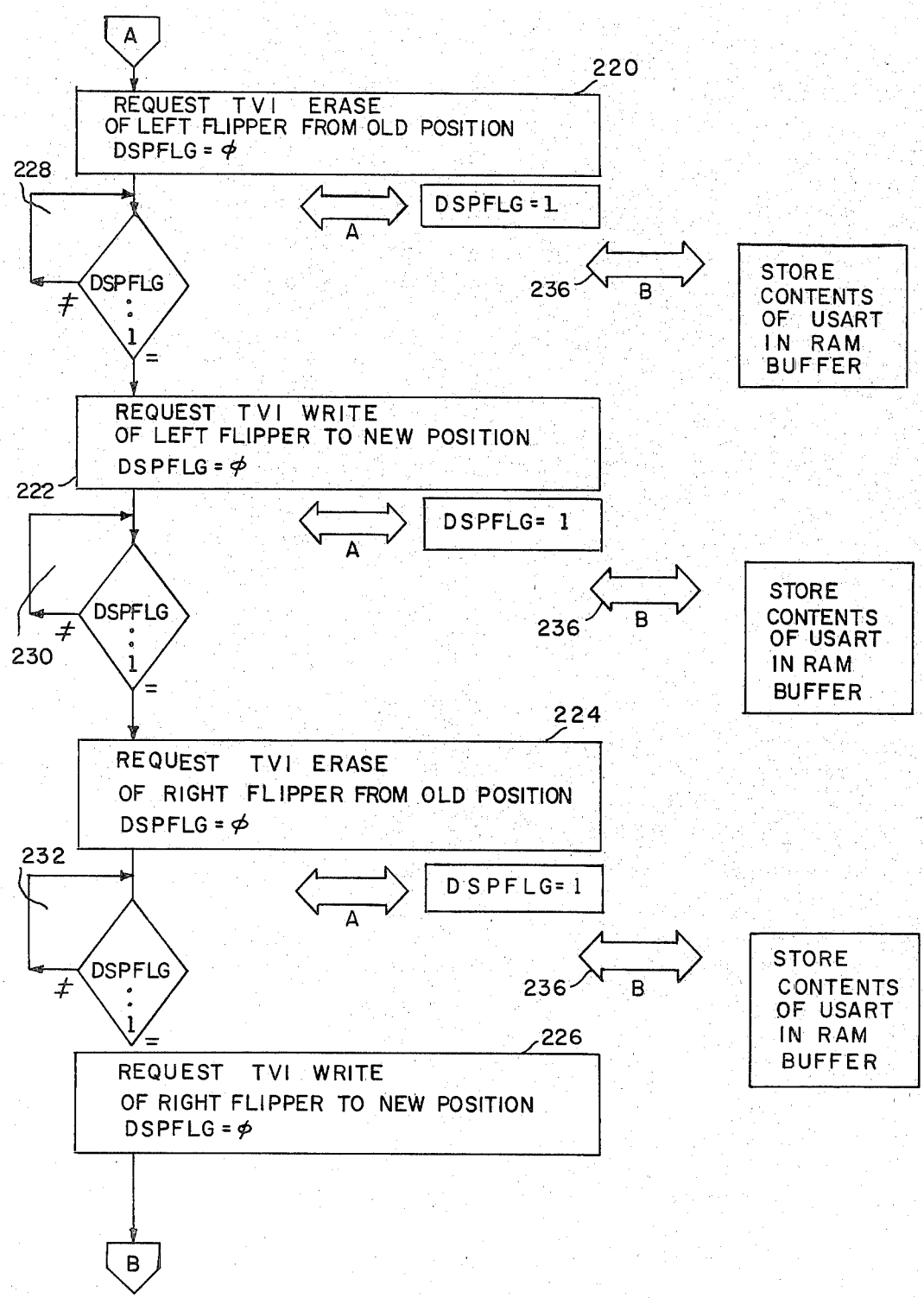
Figure 8D:
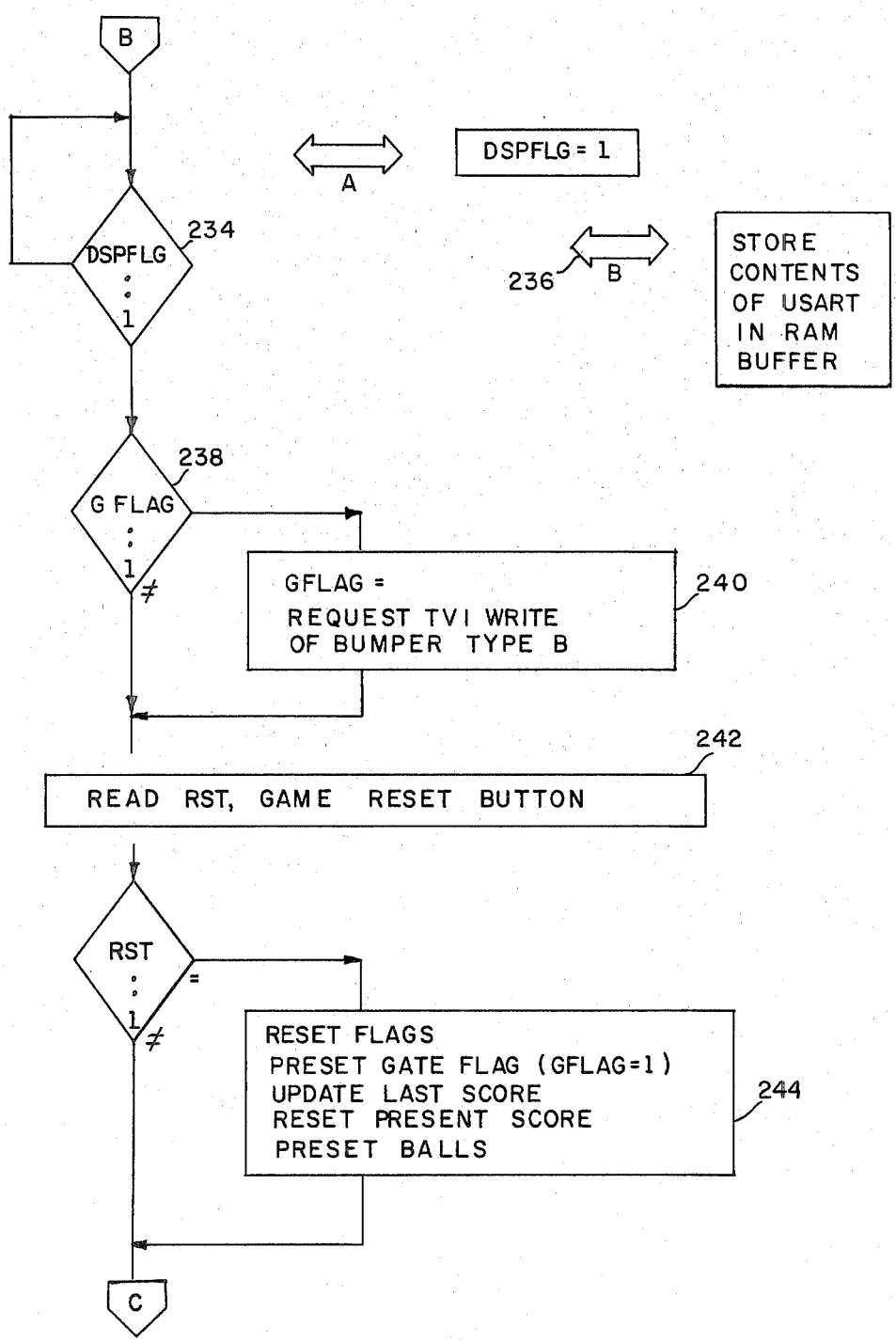
Figure 8E:
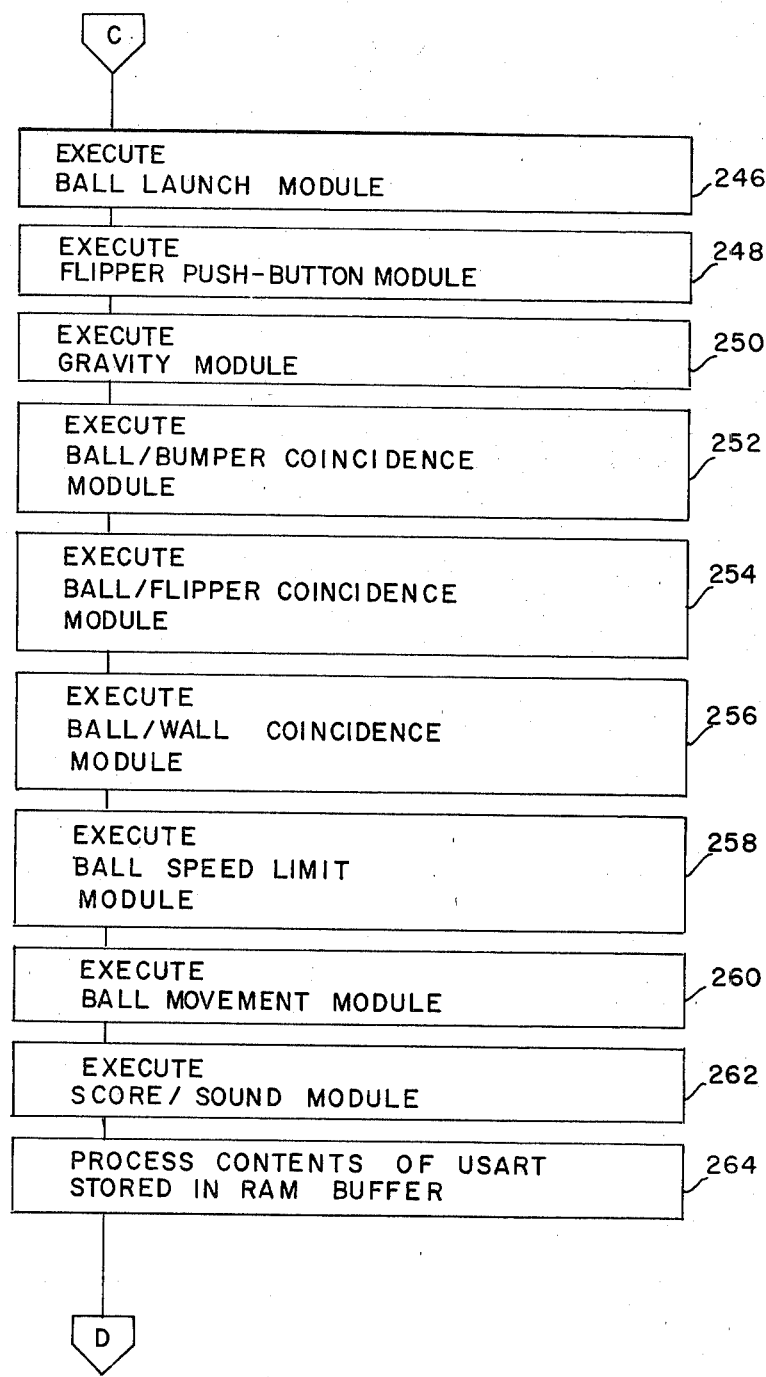

Referring now to FIGS. 8A to 8E of the drawings, there is illustrated thereby a flow chart of a typical controlling program for the pinball game described in this application. This program is stored in the PROM 92 of microprocessor 84. FIG. 8A is a glossary to the various symbology used in the flow chart.

The program starts at step 200. The microprocessor first clears the CRT RAM 112 of the television interface at step 202. The CRT RAM corresponds to a map of the raster scan display; that is, each RAM location has a corresponding location on the television screen 30. The next step of the program, 204, initializes the microprocessor RAM 94 and initializes the character RAM 110 of the television interface. Initialization of the microprocessor RAM is the fetching of information from the microprocessor PROM 92 and entering into the scratch pad RAM 94. The various commands necessary to permit the CPU 90 to converse with the peripherals of the CPU are an example of this information. Initialization of the character RAM 110 of the TVI is performed to define the shape of the various characters to be displayed on the pinball field. The microprocessor then at step 206 goes into a wait mode.

It waits until it receives an interrupt 208. The interrupt 208 occurs at the beginning of the vertical interval of a scan. The microprocessor at this point prepares an area of its RAM 94 for the storage of data from USART 80 of the VTR interface. This data is the coordinate of the characters regenerated by the video tape recorder (the data bits located in the horizontal retract interval).

At step 210 the USART 80 is initialized. Initialization of the USART is to inform the USART of the format which will constitute a data word. The format used for the present embodiment has been described hereinbefore. At step 212 request is made to the TVI to erase the ball character from its old position. The first time around in this program this is a dummy operation since the ball is not yet displayed on the screen. At this step the flag DSPFLG was initially set to zero. Step 214 is a loop to ascertain whether DSPFLG equals 1. If it does not equal 1, the microprocessor stays in the loop. If it does equal 1, indicating that the TVI is finished erasing the ball from the old position, then step 216 is executed wherein the TVI is requested to write the ball to its new position in memory. The microprocessor then via the loop 218 determines if the writing of the ball to the new position has been completed. If not, the microprocessor stays in the loop. If it has been completed, and thus, DSPFLG equals 1, step 220 of the program is executed, followed by steps 222, 224 and 226. Steps 220, 222, 224, and 226 are similar to steps 212 and 216 previously described with respect to erasing a ball from an old position and writing of the ball to a new position. In steps 220, 222, 224, and 226, the microprocessor requests the TVI to erase the left flipper from the old position, write the left flipper to the new position, erase the right flipper from the old position, and write the right flipper to the new position. The loops 228, 230, 232 and 234 are used for the ascertation as to whether or not the erasing and writing of the flippers has been accomplished prior to going onto the next step of the flow.

While the ball and flippers were being repositioned, the USART 80 has been receiving data bits from the video tape recorder. After the USART has received a data word (8 bits for this embodiment), it initiates a type B interrupt shown in the flow chart at various positions 236. These interrupts cause the CPU to cease whatever it was doing and be ready to store the contents of the USART (the received data word) in the RAM 94 of the CPU. The interrupt 236 is an asynchronous interrupt; it can occur at any time.

The next step of the flow 238 determines if the gate flag (GFLAG) (listed in the flow chart key) has been set to zero. When the RAM was originally initialized, the GFLAG was ONE. If the gate flag has been set to 1, the microprocessor requests the TVI to write in the bumpers 36, 38, 40, 42, and 50 at step 240.

At step 242, the microprocessor reads the reset game switch 10 of game generator 10 and if at this time the player has manipulated the switch and requested a game reset, the microprocessor will be so informed. If the game switch actuation has been acknowledged, at step 244 of the flow, the microprocessor will reset the flags, preset the gate flag to GFLAG=1, update the last score at position 66 on the display of FIG. 2, reset the present score to zero at position 64 on the display, and preset the number of balls on the display at position 68 to five. The flow then proceeds through steps 246 through 264. These portions of the flow chart, as well as all the other steps previously described, are set forth in detail in the computer program which is set forth in the body of the specifications after this description of the flow charts.

If the ball is in the ball launcher, step 246 makes a determination if the ball has a change in velocity due to the release of the ball launcher switch 14 or due to curvature of the ball race 71. In step 248 the microprocessor looks at the flipper switches 12 and determines the proper position of the flippers due to actuation of the flipper switches. In step 250 an increment of velocity is added to the vertical component of the velocity of the call due to the ball preceding from the top of the pinball field towards the bottom thereof.

Step 252 requires a determination to ascertain if there is coincidence between a ball and any of the bumpers, and if there is such coincidence, the microprocessor updates the velocity of the ball accordingly, changes the characteristics of the bumper such as incrementing bumper 34, or erasing part of the bumpers 36, 38, 40, 42, and 52, and, if necessary, updates the score due to the coincidence with the bumper.

Step 254 occasions the microprocessor to ascertain whether coincidence has occurred between the ball and a flipper and updates the ball velocity and direction accordingly. In step 256 the microprocessor determines coincidence between the ball and a wall 70 and again updates ball velocity accordingly.

Step 258 of the program is to limit the maximum speed of the ball to take some energy out of the system which in a real pinball game is accomplished by certain inelastic bumpers which slows the ball down.

Step 260 of the program is to execute ball movement after the ball velocities have been set in accordance with the steps above. The microprocessor multiplies the velocity by a time increment and establishes a new ball position.

In step 262 execution of the score and sound modules occurs. After a coincidence a flag is set so that later on in the sound module 100, that flag requests a sound to be emitted and the sound module accordingly operates speaker 102.

In step 264 the microprocessor looks at the USART RAM buffer, looks at the information stored there and processes it. This information pertains to the location and the characteristics of bumpers which were regenerated by the video tape recorder. After this step, the program then reverts to step 206 for a repeat of the flow described above. The computer program for accomplishing the aforementioned flow is set forth hereinafter.

This program is set forth in assembly code and to enter it into the microprocessor (in this embodiment an Intel 8085) a cross assembler is employed to convert from the assembly language to the machine language code. It is not necessary to go through this program in detail since along with the mnemonics describing the operand and data fields there are various comments to the program user indicating the function of the program instructions. For example, at step 03100 (page 1) it is easy to see that the start note is equivalent to the start step 200 of the flow chart of FIG. 8. Likewise at step 04800 (page 1) of the computer program there are clear instructions that this portion of the program clears the CRT RAM as in step 202 of the flow diagram.

Referring further along in the computer program at step 20900 (page 3) the instruction indicated by GFLAG1 is the instruction to accomplish the step 238 of the flow chart. Proceeding further into the computer program, it is apparent that in step 09900 (page 4) labeled "gravity" through step 11500 comprise the routine for accomplishing the execution of the gravity module or step 250 of the flow chart. Step 11800 (page 4) is labeled ball-flipper coincidence and the steps that follow through step 28700 clearly comprise the routine to ascertain ball-flipper coincidence as per the flow chart step 254.

After step 50300 (page 6) which is the end of step 264 of the flow chart, there are indicated a number of codes. These codes consist of data tables providing the CPU with information such as flipper origin, alphanumeric form factors, flipper outlines and the like. These are clearly indicated in the comments set forth along with the code.

The previous description of the apparatus, flow charts and software has illustrated a typical pinball game. However, the invention goes beyond that of a mere pinball game and illustrates techniques for interactive games, training, teaching, etc., in which physical objects as, for example, bumpers, walls, etc., which are derived from a video tape or disc and endowed with any number of characteristics through software.

This is illustrated by a training application for training military personnel in the use of a light antitank weapon. In this application, recorded on the video tape recorder are a background and a moving tank. The object of the training exercise is to teach military personnel how to shoot at the tank. The output from the tape recorder displays on a television receiver the background and moving tank.

The system also includes a simulated weapon having a photocell therein, which the trainee aims at the screen in order to shoot at the tank. When the trainee presses the trigger of the simulated weapon, a light spot appears on the television screen in the location where the trainee should have been pointing to hit the tank, e.g., on the tank turret. If he was in fact aiming his weapon correctly, the photocell in the weapon will produce an output responsive to the light spot. The interactive feature lies in that the video tape recorder has embedded in the horizontal retrace interval data pertaining to the tank location such that when the trainee operates his weapon, he causes the data in the horizontal interval to generate via circuitry a signal to occasion the light spot to be illuminated on the screen. Like the pinball application the data in the horizontal retract interval pertain to the information in the pictorial portion of the television scan on a field-by-field basis.

While the particular game has been described in conjunction with a video source, namely a video tape recorder or disc, any video source will suffice. For example, cable television operations are constantly looking for new uses for the cable, clearly one channel could be devoted to games and could supply the same information over the cable which is supplied by the video tape recorder 22. In broadcast environments the information now supplied by video tape recorder 22 could be supplied over the air either as presently constituted from broadcast stations or via satellite as contemplated for the near future. In either the cable or broadcast situations the cable or broadcast situation would generate the required video signals from a recording or in real time from a camera, etc. Accordingly, it is to be understood that the embodiment shown is illustrative only and that many variations and modifications may be made without departing from the principles of the invention herein disclosed and defined by the appended claims.

APPENDIX A

```
03100  START1: JMP    START2
03200          ENDIF
03300          IF    VER-1
03400  DBUG0:  DB    0C3H
03500  DBUG1:  DB    00H
03600  DBUG2:  DB    0E0H
03700          ENDIF
03800          ORG   8H
03900          JMP   0E003H
04000          ORG   2CH
04100  RST55:  JMP   RST55A
04200          ORG   34H
04300  RST65:  JMP   RST65A
04400          ORG   3CH
04500  RST75:  JMP   RST75A
04600          ORG   50H            ;STARTING ADDRESS
04700  ;             ERASE ROUTINE
04800  ;                   CLEAR CRT RAM
04900  START2: LXI   SP,STACK1
05000          MVI   A,00100100B;     FORMAT ADDRESS COUNTERS
05100          OUT   209
05200          MVI   A,0             ;INITIALIZE H,V WRITE ADDRESS
05300          STA   MVTC5
05400          STA   MVTC6
05500          OUT   200
05600          OUT   201
05700  WRT1A:  MVI   A,0             ;ZERO FLAG
05800          STA   DSPFLG
05900          MVI   A,00011110B
06000          DB    30H             ;SIM
06100          EI
06200          LDA   LL              ;GET LL
06300          LXI   H,BIT4
06400          ORA   M
06500          OUT   209             ;BLANK ENABLE
06600          STA   TXA
06700          LXI   H,BIT7          ;ENABLE R2 FOR BLOCK WRITE
06800          ORA   M
06900          OUT   209
```

```
07000 STOP1:  LDA   DSPFLG
07100         MVI   B,0
07200         CMP   B
07300         JZ    STOP1
07400 DSTP1:  MVI   A,16;           INCREMENT H COUNT BY 16
07500         LXI   H,MVTC5
07600         ADD   M
07700         STA   MVTC5
07800         OUT   200
07900         JNZ   WRT1A
08000         MVI   A,16;   CARRY, INCREMENT V COUNT BY 16
08100         LXI   H,MVTC6
08200         ADD   M
08300         STA   MVTC6
08400         OUT   201
08500         JNZ   WRT1A;
15000 START3: DI
15100         MVI   A,0             ;CLEAR FIELD FLAG
15200         STA   FFLAG
15300         STA   PBYTE1
15400         STA   PBYTE2
15500         STA   PBYTE3
15600         STA   OBLLX
15700         STA   OBLLY
15800         STA   NBLLX
15900         STA   NBLLY
16000         STA   FIELD
16100         STA   GMOVR
16200         MVI   A,0D
16300         MVI   B,8D
16400         LXI   D,A0
16500 LOOPA:  STAX  D
16600         INX   D
16700         DCR   B
16800         JNZ   LOOPA
16900         MVI   A,5D
17000         MVI   B,8D
17100         LXI   D,A8
17200 LOOPB:  STAX  D
17300         INX   D
17400         DCR   B
17500         JNZ   LOOPB
17600         MVI   A,0
17700         STA   A3
17800         STA   A6
17900         STA   A7
18000         MVI   A,1
18100         STA   GFLAG1
18200         STA   GFLAG2
18300         STA   OLFPN
18400         STA   NLFPN
18500         STA   ORFPN
18600         STA   NRFPN
18700         STA   BEXIT
18800         STA   BARACE
18900         MVI   A,0
19000         STA   VX              ;INITIALIZE VTR INDEX
19100         LXI   H,VTR
19200         SHLD  VTRP            ;INITIALIZE VTR POINTER
19300 ;
19400 ;
19500 ;      INITIALIZE CHARACTER RAM
```

```
19600           MVI     A,00000011B
19700           STA     DATA
19800   ;               BLNK
19900           LXI     D,BLNK
20000           MVI     A,9
20100           STA     HITE
20200           STA     WIDTH
20300           MVI     A,00100100B
20400           OUT     209
20500           MVI     A,0
20600           OUT     210
20700           CALL    RAM
20800   ;               PNBL
20900           LXI     D,PNBL
21000           MVI     A,2             ;INITIALIZE DIMENSIONS
21100           STA     HITE
21200           STA     WIDTH
21300           MVI     A,00010010B
21400           OUT     209
21500           MVI     A,01H
21600           OUT     210             ;INITIALIZE TX-STATUS
21700           CALL    RAM
21800   ;
21900   ;
22000   ;
22100   ;               NUMERICS
22200   ;
22300           MVI     A,01H
22400           STA     DATA
22500           MVI     A,8
22600           STA     HITE
22700           MVI     A,4
22800           STA     WIDTH
22900           MVI     A,00100011B
23000           OUT     209
23100           MVI     A,5
23200           STA     INDEX2
23300           LXI     D,ZERO
23400   LOOP1:  LDA     INDEX2
23500           OUT     210
23600           CALL    RAM
23700           LDA     INDEX2          ;DONE?
23800           CPI     14
23900           JZ      NUMR            ;YES
24000           INR     A               ;NO
24100           STA     INDEX2
24200           NOP
24300           JMP     LOOP1
24400   NUMR:   NOP
24500   ;               GATE
24600   ;
24700           MVI     A,00000010B
24800           STA     DATA
24900           LXI     D,GATE
25000           MVI     A,1
25100           STA     HITE
25200           MVI     A,8
25300           STA     WIDTH
25400           MVI     A,00001100B
25500           OUT     209
25600           MVI     A,2
25700           OUT     210
```

```
25800           CALL     RAM
25900   ;
26000   ;
26100   ;
26200           LXI      SP,STACK1              ;CLEAR STACK
26300   ;
26400   BUFI:   MVI      A,00011011B            ;ENABLE FIELD INTERRUPT
26500           DB       30H;                   SIM
26600           EI
26700           HLT
26800   ;
26900           MVI      A,USCMD1               ;INITIALIZE USART
27000           OUT      193
27100           MVI      A,USMD
27200           OUT      193
27300           MVI      A,USCMD2
27400           OUT      193
27500           LDA      FIELD
27600           INR      A
27700           STA      FIELD
27800           LXI      SP,STACK1              ;REINITIALIZE THE STACK
27900   ;
28000           JMP      GAME2
28100   ;
28200   ;

00100   ;
00200   ;
00300   ;
00400   ;       RAM SUBROUTINE
00500   ;               LOADS A WIDTH BY HITE BLOCK OF DATA INTO THE CHARACTER
00600   ;       RAM.
00700   ;               ASSUMES THAT INFORMATION HAS BEEN SENT OUT
00800   ;       209 AND 210 TO DEFINE THE TX CONFIGURATION AND TYPE.
00900   ;               D AND E REGISTERS ARE ASSUMED TO CONTAIN
01000   ;       THE STARTING ADDRESS OF THIS BLOCK OF DATA.
01100   ;       EACH BYTE OF THIS BLOCK CORRESPONDS TO A LINE OF
01200   ;       CHARACTER. BITS ARE LEFT JUSTIFIED.
01300   ;               DATA IS ASSUMED TO CONTAIN A BIT PATTERN OF
01400   ;       DI1, DI0 FOR PORT 208.
01500   RAM:    MVI      B,0                    ;ZERO LINE COUNTER
01600           MVI      A,0
01700           OUT      208                    ;RESET ADDRESS COUNTER
01800           LXI      H,DATA
01900   RAM1:   LDA      HITE
02000           CMP      B                      ;DONE?
02100           JZ       RAM5                   ;YES
02200           LDAX     D                      ;NO
02300           STA      TEMP1
02400           MVI      C,0                    ;ZERO SEGMENT COUNT
02500   RAM2:   LDA      WIDTH
02600           CMP      C                      ;DONE?
02700           JZ       RAM4                   ;YES
02800           LDA      TEMP1                  ;NO
02900           RAL
03000           STA      TEMP1
03100           INR      C
03200           JC       RAM3                   ;CARRY, BITS ON.
03300           MVI      A,10100000B            ;NO CARRY, BITS OFF.
03400           OUT      208                    ;ENABLE R1, C1 COMPLEMENT
03500           MVI      A,00100000B            ;DISABLE R1
03600           OUT      208
```

```
03700           JMP     RAM2
03800   RAM3:   MVI     A,00100000B
03900           ORA     M
04000           OUT     208
04100           ORI     10000000B
04200           OUT     208
04300           MVI     A,00100000B
04400           OUT     208
04500           JMP     RAM2
04600   RAM4:   INR     B
04700           INX     D
04800           JMP     RAM1
04900   RAM5:   MVI     A,0             ;RESET ADDRESS COUNTER
05000           OUT     203
05100           RET
05200   ;
05300   ;
05400   ;               VIDEO INTERFACE
05500   ;
05600   ;       D,E REGISTERS ARE ASSUMED TO POINT
05700   ;       TO THE BEGINNEING OF A DATA BLOCK:
05800   ;               H START
05900   ;               V START
06000   ;       TX STATUS B ( OUT 209 ) ASSUMED SET
06100   ;       TX STATUS C (OUT 210 ) ASSUMED SET
06200   ;       INTERRUPT MASK ASSUMED TO BE SET TO 0001 1110 B .
06300   ;       ROUTINE RESETS DSPFLG AND RETURNS CONTROL
06400   ;       TO JOB. UPON COMPLETION OF TRANSFER, DSPFLG IS SET.
06500   VINT:   LDAX    D
06600           OUT     200
06700           INX     D
06800           LDAX    D
06900           OUT     201
07000           MVI     A,0
07100           STA     DSPFLG
07200           MVI     A,01000000B     ;ENABLE R2
07300           OUT     208
07400           RET
07500   ;
00100   ;
00200   ;
00300   ;
00400   ;
00500   ;
00600   ;               INTERRUPT ROUTINE       -------     ROM2
00700           IF      VER
00800           ORG     0400H
00900           ENDIF
01000           IF      VER-1
01100           ORG     0F000H
01200           ENDIF
01300   RST55A: PUSH    PSW
01400           MVI     A,01H           ;VIDEO INTERFACE
01500           STA     DSPFLG
01600           ANI     0
01700           OUT     208             ; RESET R2
01800           POP     PSW
01900           EI
02000           RET
02100   RST65A: PUSH    PSW
02200           PUSH    H
02300           JMP     USART
```

```
02400 RST75A: PUSH    PSW
02500         PUSH    H
02600         JMP     FINT
02700
02800
02900 ;               SUBROUTINE USART
03000 ;
03100 USART:  IN      192
03200         LHLD    VTRP
03300         XCHG
03400         STAX    D
03500         INX     D
03600         XCHG
03700         SHLD    VTRP
03800         LDA     VX
03900         INR     A
04000         STA     VX
04100         CPI     04H             ;DISABLE INTERRUPT
04200         JNZ     USART1          ;   WHEN BUFFER IS FULL.
04300         MVI     A,00001110B
04400         DB      30H;            SIM
04500 USART1: POP     H
04600         POP     PSW
04700         EI
04800         RET
04900 ;
05000 ;               SUBROUTINE FINT
05100 FINT:   MVI     A,0             ;CLEAR USART BUFFER
05200         STA     VX
05300         LXI     H,VTR
05400         SHLD    VTRP
05500         POP     H
05600         POP     PSW
05700         EI
05800         RET
05900 ;
06000 ;
06100 ;                       GAME ROUTINE
06200 ;               THIS ROUTINE IS EXECUTED ONCE PER FIELD. THE
06300 ;       EXECUTION IS TIME SHARED WITH THE DISPLAY ROUTINE
06400 ;       ON AN INTERRUPT BASIS.
06500 ;
06600 GAME:   NOP                     ;THIS CODE MAY NOT CALL DSP1A
06700         NOP
06800         NOP
06900 GAME1:  LDA     DFLAG
07000         MVI     B,0
07100         CMP     B
07200         JZ      GAME1
07300         NOP                     ;THIS CODE MAY CALL DSP1A
07400         NOP
07500                                 ;
07600                                 ; SET UP TO CALL DISPLAY
07700 ;
07800 ;
07900 ;       *****   DISPLAY *******
08000 ;
08100 ;       ------ WARNING  : THIS CODE ACCESSES A LOW RESOLUTION
08200 ;       SYSTEM. THE LEAST SIGNIFICANT BITS OF THE POSITION
08300 ;       WORDS ARE IGNORED. POSITION WORDS HAVE A RANGE OF
08400 ;       0 TO AND INCLUDING 254...
08500 ;
```

```
09600  GAME2:  MVI    A,00011100B      ;SET INT MASK
08700          DB     30H              ; SIM
08800          MVI    A,00010010B
08900          OUT    209
09000  ;              BALL DISPLAY
09100          MVI    A,0              ;ERASE OLD BALL
09200          OUT    210
09300          LXI    D,OBLLX
09400          CALL   VINT
09500  BDSP1:  LDA    DSPFLG           ;WAIT
09600          CPI    0
09700          JZ     BDSP1
09800          MVI    A,1
09900          OUT    210
10000          LXI    D,NBLLX
10100          CALL   VINT             ;WRITE NEW BALL
10200          LDA    OBLLX            ;SAVE PAST CO-ORDINATES
10300          STA    PBLLX
10400          LDA    OBLLY
10500          STA    PBLLY
10600          LDA    NBLLY            ;UPDATE POSITION
10700          STA    OBLLX
10800          LDA    NBLLY
10900          STA    OBLLY
11000  BDSP2:  LDA    DSPFLG           ;WAIT
11100          CPI    0
11200          JZ     BDSP2
11300          IN     131              ;COINCIDENCE?
11400          STA    COIN
11500  ;------- NOTE: COINCIDENCE DETECTED ONLY WHEN NBLL(X,Y) NOT EQUAL OBLL(X,Y)
11600  ;
11700  ;                    FLIPPER DISPLAY
11800  ;
11900          MVI    A,0
12000          OUT    210
12100          LDA    OLFPN            ;LEFT FLIPPER
12200          STA    FPN
12300          LXI    H,LF1
12400          CALL   FLOC
12500          CALL   FDSP             ;ERASE
12600          MVI    A,1
12700          OUT    210
12800          LDA    NLFPN
12900          STA    FPN
13000          STA    OLFPN            ;UPDATE OLD POSITION
13100          LXI    H,LF1
13200          CALL   FLOC
13300          CALL   FDSP             ;WRITE
13400  LOOP4:  LDA    DSPFLG           ;WAIT
13500          CPI    1
13600          JNZ    LOOP4
13700          MVI    A,0
13800          OUT    210
13900          LDA    ORFPN            ;RIGHT FLIPPERS
14000          STA    FPN
14100          LXI    H,RF1
14200          CALL   FLOC
14300          CALL   FDSP             ;ERASE
14310  LOOP5:  LDA    DSPFLG
14320          CPI    1
14330          JNZ    LOOP5
14400          MVI    A,1
```

```
14500           OUT     210
14600           LDA     NFFPN
14700           STA     FPN
14800           STA     ORFPN
14900           LXI     H,AF1
15000           CALL    FLOC
15100           CALL    FDSP            ;WRITE
15200   ;                       DISPLAY ROUTINE
15300   ;
15400   ;               DISPLAY TABLE SCAN
15500   ;       THIS ROUTINE IS ACCESSED ONCE PER FIELD.
15600   DSP:    MVI     A,00100011B;    SET TX DIMENSION
15700           OUT     209
15800           LDA     FIELD
15900           ANI     00001111B
16000           STA     AX
16100           MOV     E,A
16200           MVI     D,0
16300           LXI     H,A0
16400           DAD     D
16500           XCHG
16600           LDAX    D
16700           OUT     210
16800           ANI     0
16900           LDA     AX
17000           RAL
17100           MOV     E,A
17200           MVI     D,0
17300           LXI     H,AC0
17400           DAD     D
17500           XCHG
17600   ADSP1:  LDA     DSPFLG
17700           CPI     1
17800           JNZ     ADSP1
17900           CALL    VINT
18000           JMP     GDSP1
18100   ;
18200   ;                               ( FLIPPERS )
18300   FDSP:   MVI     A,8
18400           MOV     B,A             ;FLIPPER SEGMENT
18500   FDSP1:  LDA     DSPFLG          ;READY FOR NEW WRITE?
18600           CPI     1
18700           JNZ     FDSP1           ;NO
18800           CALL    VINT            ;YES
18900           INX     D
19000           DCR     B               ;END?
19100           JNZ     FDSP1           ;NO
19200           RET                     ;YES
19300   ;
19400   ; FLIPPER MEMORY LOCATION .. REG ( D,E ) = C ( H,L ) + 16 *( FPN - 1 )
19500   ;
19600   FLOC:   ANI     0               ;CLEAR CARRY
19700           LDA     FPN
19800           DCR     A
19900           RAL
20000           RAL
20100           RAL
20200           RAL
20300           MOV     E,A
20400           MVI     D,0
20500           DAD     D
20600           XCHG
```

```
20700           RET
20800   ;
20900   GDSP1:  LDA     GFLAG1          ;REFRESH GATE?
21000           CPI     1
21100           JNZ     GDSP1R          ;NO
21200           MVI     A,0
21300           STA     GFLAG1
21400           LXI     D,GATEX         ;YES
21500   GDSP1A: LDA     DSPFLG          ;WAIT
21600           CPI     1
21700           JNZ     GDSP1A
21800           MVI     A,00001100B
21900           OUT     209
22000           MVI     A,2
22100           OUT     210
22200           CALL    VINT
22300   GDSP1R: NOP
22400           LDA     GFLAG2          ;REFRESH GATE?
22500           CPI     01H
22600           JNZ     GDSP2R
22700           MVI     A,0
22800           STA     GFLAG2
22900           LXI     D,GAT1X
23000           MVI     A,4
23100           MOV     B,A
23200   GDSP2:  LDA     DSPFLG
23300           CPI     1
23400           JNZ     GDSP2
23500           CALL    VINT
23600           INX     D
23700           DCR     B
23800           JNZ     GDSP2
23900   GDSP2R: NOP
24000   ;
24100           IN      131             ;TEST1 SWITCH SET?
24200           LXI     H,BIT3
24300           ANA     M
24400           JZ      BALLT           ;YES
24500           JMP     GAME3           ;NO
24600   BALLT:  LDA     NBLLX           ;BALL TEST
24700           INR     A
24800           STA     NBLLX
24900           STA     NBLLY
25000   ;
25100   ;
25200   ;                       FLIPPER TEST
25300   ;
25400           LDA     FIELD
25500           CPI     0
25600           JNZ     FTR
25700           LDA     NLFPN
25800           DCR     A
25900           JNZ     FT1
26000           MVI     A,5
26100   FT1:    STA     NLFPN
26200   FTR:    NOP
26300   ;
26400   ;
26500   TESTR:  JMP     BUFI
26600                                   ;
26700                                   ;
26800   GAME3:  NOP
```

```
26900           IF      VER-1
27000                                   ; DISABLE INTERRUPTS
27100           ENDIF
27200                                   ;
27300                                   ;
27400                                   ;=============== GAME START PUSHBUTTON TEST AND RESPONSE ======
27500           ;
27600   GM3A:   IN(131)                 ; INPUT & MASK 'START GAME' PUSHBUTTON
27700           ANI     8H
27800           CPI     8H              ; BUTTON DOWN ?
27900           JNZ     GOT
28000           LDA     A1              ; YES, IF A1 (= BALLS REMAINING) <> 0 THEN
28100                                   ; DO
28200           CPI     0AH
28300           JZ      GOT
28400           LDA     A8
28500           STA     A12
28600           LDA     A9
28700           STA     A13
28800           LDA     A10
28900           STA     A14
29000           LDA     A11
29100           STA     A15
29200           MVI     A,5H
29300           STA     A2              ;   RESET ACTIVE NUMERAL BUMPER
29400           MVI     A,0AH
29500           STA     A1              ;   SET BALLS REMAINING' TO 5
29600           MVI     A,5H
29700           STA     A8              ;   RESET 'PRESENT SCORE'
29800           STA     A9
29900           STA     A10
30000           STA     A11
30100           MVI     A,0
30200           MOV     L,A
30300           MOV     H,A
30400           SHLD    NSCOR
30500                                   ;   GAMEOVER = 0
30600           MVI     A,0H
30700           STA     GMOVR
30800                                   ;   RESET WIPE-OUT BUMPER FLAGS
30900           MVI     A,1H
31000           STA     GFLAG1
31100           STA     GFLAG2
31200                                   ; END
31300                                   ; IF GAME-OVER = 1 THEN SKIP TO END (SC6) E  CONTINUE
31400   GOT:    LDA     GMOVR
31500           CPI     1H
31600           JNZ     GM3
31700           JMP     SC6
31800                                   ;===============END GAMESTART PB TEST====================
31900                                   ;
32000                                   ;
32100   ;************************* BALLRACE MODULE ************************************
32200                                   ;
32300                                   ;==============================================================
32400                                   ;
32500                                   ; SYMBOL TABLE FOR WORKING BYTES
32600                                   ;
32700                                   ; BEXIT      FLAG SET TO 01H WHEN BALL LEAVES PLAYING FIELD
32800                                   ;            (INITIAL VALUE = 01H)
32900                                   ;
```

```
33000                    ; BFLAG      FLAG SET TO 01H WHEN COINCIDENCE
33100                    ;            DETECTED BETWEEN BALL AND BUMPER ON
33200                    ;            LEFT EDGE OF RACE.
33300                    ;
33400                    ; BARACE     FLAG SET TO 01H WHILE BALL IN RACE
33500                    ;
33600                    ; CHAR1      DEFINES THE CHARACTER TYPE, IE BALL
33700                    ;            BUMPER, FLIPPER, ETC.
33800                    ;
33900                    ; FLDNO      FORMAT 0,0,0,0,B3,B2,B1,B0, DEFINES
34000                    ;            THE NUMBER OF FIELDS FOR WHICH THE BALL
34100                    ;            FOLLOWS THE RACE. DECREMENTED ONCE PER FIELD
34200                    ;            WHEN > 0.
34300                    ;
34400                    ; HBALL(I)   ARRAY OF 149 BYTES DEFINING HORIZONTAL COORD-
34500                    ;            INATES OF BALL IN RACE.
34600                    ;
34700                    ; I          BALL TRAJECTORY TABLE POINTER.
34800                    ;
34900                    ; NVX        NEGATIVE X INITIAL VELOCITY COMPONENT
35000                    ;
35100                    ; PBYTE1     DATA BYTE READ FROM PLUNGER I/O PORT.
35200                    ;
35300                    ; PBYTE2,3   PLUNGER DATA BYTE HISTORY. (INITIAL VALUE = OH)
35400                    ;
35500                    ; PVX        POSITIVE X INITIAL VELOCITY COMPONENT
35600                    ;
35700                    ; VBALL(I)   ARRAY OF 149 BYTES DEFINING VERTICAL COORD-
35800                    ;            INATES OF BALL IN RACE.
35900                    ;
36000                    ; NBLX       DEFINES THE CHARACTER (BALL) NEW X POSITION.
36100                    ;
36200                    ; NBLLY      DEFINES THE CHARACTER (BALL) NEW Y POSITION.
36300                    ;
36400                    ; XINC1      2'S COMPLIMENT BALL X VELOCITY. (LS BYTE)
36500                    ;            DECIMAL POINT BETWEEN BITS 3 & 4.
36600                    ;
36700                    ; YINC1      2'S COMPLIMENT BALL Y VELOCITY. (LS BYTE)
36800                    ;            DECIMAL POINT BETWEEN BITS 3 & 4.
36900                    ;
37000                    ;================================================================
37100                                 ;
37200                                 ;
37300 GM3:  NOP
37400 HBL   EQU   0C0H
37500 VBL   EQU   0B4H
37600                                 ;
37700                                 ; IF BEXIT = 00H THEN
37800       LDA   BEXIT
37900       CPI   00H
38000       JNZ   PT2
38100                                 ;   DO
38200                                 ;     IF BARACE = 01H THEN
38300                                 ;       DO
38400       LDA   BARACE
38500       CPI   01H
38600       JNZ   PT3
38700                                 ;         IF FIELDNO = 0H THEN
38800       LDA   FLDNO
38900       CPI   0H
39000       JNZ   PT3
39100                                 ;           BARACE = 00H
```

```
39200         MVI    A,0H
39300         STA    BARACE
39400                              ;      IF BUMPERFLAG = 01H THEN XINC1 = PVX
39500                              ;      ELSE  XINC1 = NVX
39600         LDA    BFLAG
39700         CPI    01H
39800         JNZ    PT2A
39900         LHLD   PVX
40000         JMP    PT2B
40100 PT2A:   LHLD   NVX
40200 PT2B:   SHLD   XINC1
40300                              ;      IF OBLLY > VBL-9AH THEN YINC1=PVY
40400                              ;      ELSE YINC1=0
40500         MVI    A,VBL-9AH
40600         LXI    H,OBLLY
40700         CMP    M
40800         JNC    PT2C
40900         LHLD   PVY
41000         SHLD   YINC1
41100         JMP    PT2D
41200 PT2C:   MVI    A,0H
41300         STA    YINC1
41400                              ;           NBLLX1 = 0
41500 PT2D:   MVI    A,0H
41600         STA    NBLLX1
41700                              ;           NBLLY1 = 0
41800         STA    NBLLY1
41900                              ;           YINC2 = 0
42000         STA    YINC2
42100                              ;           NBLLX2 = NBLLX
42200         LDA    NBLLX
42300         STA    NBLLX2
42400                              ;           NBLLY2 = NBLLY + 2
42500         LDA    NBLLY
42600         INR    A
42700         INR    A
42800         STA    NBLLY2
42900                              ;      IF NBLLX2 > HBL-47H THEN NBLLX2=NBLLX2-1
43000                              ;      ELSE NBLLX2 = NBLLX2 +1
43100         MVI    A,HBL-47H
43200         LXI    H,NBLLX2
43300         CMP    M
43400         JNC    PNT1
43500         LXI    H,NBLLX2
43600         DCR    M
43700         JMP    PT3
43800 PNT1:   LXI    H,NBLLX2
43900         INR    M
44000         JMP    PT3
44100                              ;      ELSE DO
44200
44300                              ;           FIELDNO =  FIELDNO - 1
44400 PT3:    LXI    H,FLDNO
44500         DCR    M
44600                              ;      IF BUMPERFLAG = 1 THEN
44700         LXI    H,BFLAG
44800         MOV    A,M
44900         CPI    1H
45000         JNZ    PT5
45100                              ;           I = I - 1
45200         LXI    H,I
45300         DCR    M
```

```
45400           JMP     PT6
45500                                   ;               ELSE I = I + 1
45600  PT5:     LXI     H,I
45700           INR     M
45800                                   ;               NBLLX = HBALL(I)
45900  PT6:     LHLD    I
46000           MVI     H,0
46100           LXI     B,HBALL
46200           DAD     B
46300           MOV     A,M
46400           STA     NBLLX
46500                                   ;               NBLLY = VBALL(I)
46600           LHLD    I
46700           MVI     H,0
46800           LXI     B,VBALL
46900           DAD     B
47000           MOV     A,M
47100           STA     NBLLY
47200                                   ;           IF NBLLX = HBL-92H THEN BPERFLAG = 1
47300                                   ;           [(HBL-92H) IS THE X POSITION OF THE BUMPER
47400                                   ;           AT THE LEFT EXTREME OF THE RACE ]
47500           LDA     NBLLX
47600           CPI     HBL-92H
47700           NOP
47800           JNZ     PT7
47900           LXI     H,BFLAG
48000           MVI     M,1H
48100                                   ;               END
48200                                   ;           END
48300  PT7:     NOP
48400                                   ;       END
48500  PT4:     JMP     PT0
48600                                   ;   ELSE
48700                                   ;   DO
48800                                   ;       I = 0H
48900  PT2:     LXI     H,I
49000           MVI     M,0H
49100                                   ;       BFLAG = 0H
49200           LXI     H,BFLAG
49300           MVI     M,0H
49400                                   ;       FIELDNO = 0H
49500           LXI     H,FLDNO
49600           MVI     M,0H
49700                                   ;       NBLLX = HBALL(I)
49800           LHLD    I
49900           MVI     H,0
50000           LXI     B,HBALL
50100           DAD     B
50200           MOV     A,M
50300           STA     NBLLX
50400                                   ;       NBLLY = VBALL(I)
50500           LHLD    I
50600           MVI     H,0
50700           LXI     B,VBALL
50800           DAD     B
50900           MOV     A,M
51000           STA     NBLLY
51100                                   ;
51200                                   ;
51300                                   ; PLUNGER SUBROUTINE
51400                                   ;   PBYTE3 = PBYTE2
51500  PLNGR:   LDA     PBYTE2
```

```
51600         STA   PBYTE3
51700                              ;   PBYTE2 = PBYTE1
51800         LDA   PBYTE1
51900         STA   PBYTE2
52000                              ;   PBYTE1 = INPUT(129D) AND 0FH
52100         PUSH  PSW
52200         IN    81H
52300         ANI   0FH
52400         STA   PBYTE1
52500                              ;   IF PBYTE1 = 0H THEN
52600         CPI   0H
52700         POP   H
52800         JNZ   PT10
52900                              ;   IF PBYTE3 = 0 THEN
53000         LDA   PBYTE3
53100         CPI   0H
53200         JZ    PT10
53300                              ;     DO
53400                              ;       BEXIT = 00H
53500         LXI   H,BEXIT
53600         MVI   M,00H
53700                              ;       FLDNO = PBYTE3
53800         LDA   PBYTE3
53900                              ; MULTIPLY PBYTE3 (= FLDNO) TIMES 16
54000         RAL
54100         RAL
54200         RAL
54300         RAL
54400         STA   FLDNO
54500                              ;       PBYTE1 = 0
54600         MVI   A,0
54700         STA   PBYTE1
54800                              ;       PBYTE2 = 0
54900         STA   PBYTE2
55000                              ;       PBYTE3 = 0
55100         STA   PBYTE3
55200                              ;       IF A1 (BALLS REMAINING) = 0 (5) THEN GMOVR=1
55300         LDA   A1
55400         CPI   5H
55500         JNZ   PL1
55600         MVI   A,1H
55700         STA   GMOVR
55800         JMP   PT10
55900                              ;       ELSE A1 (BALLS REMAIN) = A1 - 1
56000  PL1:   LXI   H,A1
56100         DCR   M
56200                              ;     END
56300                              ;
56400                              ; END PLUNGER SUBROUTINE
56500  PT10:  NOP
56600                              ;
56700                              ;
56800  PT8:   NOP
56900                              ;
57000                              ;
57100                              ;*********************** END BALLRACE MODULE *************************
57200                              ;
57300         JMP   FBTN
```

```
00100                              ;
00200                              ;
00300                              ;
00400  ;
00500  ;         PAGE    4    - ROM 3 -
00600       IF    VER
00700       ORG   0900H
00800       ENDIF
00900       IF    VER-1
01000       ORG   0F400H
01100       ENDIF
01200  ;
01300  ;    FLIPPER BUTTONS
01400  ;
01500  FBTN:  IN   131        ; LEFT BUTTON DOWN?
01600       LXI   H,BIT6
01700       ANA   M
01800       JZ    FBTN3        ;YES
01900       LDA   FONP         ;NO, PRESET FON
02000       STA   LFON
02100       LDA   LFOFF
02200       DCR   A            ;DEBOUNCED?
02300       JZ    FBTN1        ;YES
02400       STA   LFOFF        ;NO
02500       JMP   LFR
02600  FBTN1: LDA  FOFFP
02700       STA   LFOFF        ;PRESET FOFF
02800       LDA   NLFPN
02900       DCR   A            ;DECREMENT POSITION
03000       JZ    FBTN1A
03100       STA   NLFPN
03200       MVI   A,0
03300       JMP   FBTN1B
03400  FBTN1A: MVI A,1         ;DEAD FLIPPER
03500  FBTN1B: STA LFSTP
03600  FBTN2: JMP  LFR
03700  FBTN3: LDA  FOFFP
03800       STA   LFOFF        ;PRESET TIP
03900       LDA   LFON
04000       DCR   A            ;DEBOUNCED?
04100       JZ    FBTN4        ;YES
04200       STA   LFON         ;NO
04300       JMP   LFR
04400  FBTN4: LDA  FONP        ;YES
04500       STA   LFON         ;PRESET FON
04600       LDA   NLFPN
04700       INR   A
04800       CPI   12
04900       JZ    FBTN4A
05000       STA   NLFPN
05100       MVI   A,0
05200       JMP   FBTN4B
05300  FBTN4A: MVI A,1         ;DEAD FLIPPER
05400  FBTN4B: STA LFSTP
05500  LFR:  NOP
05600       IN    131          ;RIGHT BUTTON DOWN?
05700       LXI   H,BIT5
05800       ANA   M
05900       JZ    FBTN7        ;YES
06000       LDA   FONP         ;NO , PRESET FONP
06100       STA   RFON
06200       LDA   RFOFF
```

```
06300           DCR     A               ;DEBOUNCED?
06400           JZ      FBTN5           ;YES
06500           STA     RFOFF           ;NO
06600           JMP     RFR
06700   FBTN5:  LDA     FOFFP
06800           STA     RFOFF           ;PRESET FOFF
06900           LDA     NRFPN
07000           DCR     A
07100           JZ      FBTN5A
07200           STA     NRFPN
07300           MVI     A,0
07400           JMP     FBTN5B
07500   FBTN5A: MVI     A,1
07600   FBTN5B: STA     RFSTP
07700   FBTN6:  JMP     RFR
07800   FBTN7:  LDA     FOFFP
07900           STA     RFOFF
08000           LDA     RFON
08100           DCR     A
08200           JZ      FBTN8
08300           STA     RFON
08400           JMP     RFR
08500   FBTN8:  LDA     FONP
08600           STA     RFON
08700           LDA     NRFPN
08800           INR     A
08900           CPI     12
09000           JZ      FBTN8A
09100           STA     NRFPN
09200           MVI     A,0
09300           JMP     FBTN8B
09400   FBTN8A: MVI     A,1
09500   FBTN8B: STA     RFSTP
09600   RFR:    NOP
09700                                   ;
09800                                   ;
09900           ;                       GRAVITY
10000   ;
10100           LDA     BARACE
10200           CPI     0               ;BALL IN RACE?
10300           JNZ     GRAVR           ;YES
10400           LDA     GRAV            ;NO
10500           DCR     A               ;TIME TO INCREMENT VY ?
10600           STA     GRAV
10700           JNZ     GRAVR           ;NO
10800           LDA     GRAVP           ;YES
10900           STA     GRAV
11000           LHLD    YINC1
11100           INX     H
11200           INX     H
11300           INX     H
11400           SHLD    YINC1
11500   GRAVR:  NOP
11600   ;
11700   ;
11800   ;                       BALL/FLIPPER COINCIDENCE
11900   ;
12000           LDA     COIN
12100           ANI     01H             ;COINCIDENCE?
12200           JZ      COINR           ;NO
12300           LDA     NBLLY           ;YES, BUMPER?
12400           CPI     BMPY+16D
```

```
12500           JNC     COIN1           ;NO
12600           LDA     SOUND           ;YES
12700           ORI     00000100B
12800           STA     SOUND
12900           MVI     A,BMPX+4
13000           STA     BUMPX
13100           MVI     A,BMPY+8
13200           STA     BUMPY
13300           MVI     A,2
13400           STA     BASX
13500           CALL    BUMP
13600           JMP     COINR
13700   COIN1:  CPI     09CH            ; GATE?
13800           JNC     FCNA            ;NO
13900           LDA     SOUND           ;YES
14000           ORI     00000010B
14100           STA     SOUND
14200           LDA     YINC2           ; RISING BALL?
14300           CPI     10000000B
14400           JNC     COINR           ;YES
14500           LHLD    YINC1           ;NO
14600           CALL    RTH
14700           CALL    CHL
14800           SHLD    YINC1
14900           JMP     COINR
15000   FCNA:   LDA     SOUND           ;FLIPPER
15100           ORI     00100000B
15200           STA     SOUND
15300           LDA     NBLLX
15400           CPI     07AH            ;LEFT FLIPPER?
15500           JC      FCNB            ;YES
15600           LDA     RFSTP           ;NO
15700           JMP     FCNC
15800   FCNB:   LDA     LFSTP
15900   FCNC:   STA     FSTP
16000           CPI     01H             ;DEAD FLIPPER?
16100           JNZ     FCND            ;NO
16200           LHLD    XINC1           ;YES
16300           CALL    RTH
16400           CALL    RTH
16500           SHLD    XINC1
16600           LHLD    YINC1
16700           CALL    RTH
16800           CALL    RTH
16900           SHLD    YINC1
17000   FCND:   LDA     YINC2           ; FLIPPER - RISING BALL?
17100           CPI     10000000B
17200           JC      FCN0            ;NO
17300           JMP     FCNR1
17400   FCN0:   LDA     NBLLX           ;NO
17500           CPI     07AH            ;LEFT FLIPPER?
17600           JC      FCN1            ;YES
17700           LDA     NRFPN           ;NO
17800           CPI     10
17900           JNC     RVEL5
18000           CPI     8
18100           JNC     RVEL4
19200           CPI     5
19300           JNC     RVEL3
18400           CPI     3
18500           JNC     RVEL2
```

```
18600  RVEL1:  LHLD   YINC1
18700          CALL   ROTH
18800          CALL   CHL
18900          SHLD   TEMP1
19000          LHLD   XINC1
19100          CALL   ROTH
19200          CALL   CHL
19300          JMP    FCNR
19400  RVEL2:  LHLD   YINC1
19500          XCHG
19600          LHLD   XINC1
19700          CALL   DSUB
19800          SHLD   TEMP1
19900          LHLD   XINC1
20000          XCHG
20100          LHLD   YINC1
20200          DAD    D
20300          CALL   CHL
20400          JMP    FCNR
20500  RVEL3:  JMP    LVEL3
20600  RVEL4:  LHLD   YINC1
20700          XCHG
20800          LHLD   XINC1
20900          DAD    D
21000          SHLD   TEMP1
21100          LHLD   YINC1
21200          XCHG
21300          LHLD   XINC1
21400          CALL   DSUB
21500          JMP    FCNR
21600  RVEL5:  LHLD   YINC1
21700          CALL   ROTH
21800          SHLD   TEMP1
21900          LHLD   XINC1
22000          CALL   ROTH
22100          JMP    FCNR
22200  FCN1:   LDA    NLFPN    ;DETERMINE FLIPPER POSITION
22300          CPI    10
22400          JNC    LVEL5
22500          CPI    8
22600          JNC    LVEL4
22700          CPI    5
22800          JNC    LVEL3
22900          CPI    3
23000          JNC    LVEL2
23100  LVEL1:  LHLD   YINC1
23200          CALL   ROTH
23300          SHLD   TEMP1
23400          LHLD   XINC1
23500          CALL   ROTH
23600          JMP    FCNR
23700  LVEL2:  LHLD   XINC1
23800          XCHG
23900          LHLD   YINC1
24000          DAD    D
24100          SHLD   TEMP1
24200          LHLD   YINC1
24300          XCHG
24400          LHLD   XINC1
24500          CALL   DSUB
24600          JMP    FCNR
```

```
24700  LVEL3:  LHLD    YINC1
24800          CALL    ROTH
24900          CALL    CHL
25000          SHLD    YINC1
25100          JMP     FCNR1
25200  LVEL4:  LHLD    YINC1
25300          XCHG
25400          LHLD    XINC1
25500          CALL    DSUB
25600          SHLD    TEMP1
25700          LHLD    XINC1
25800          XCHG
25900          LHLD    YINC1
26000          DAD     D
26100          CALL    CHL
26200          JMP     FCNR
26300  LVEL5:  LHLD    YINC1
26400          CALL    ROTH
26500          CALL    CHL
26600          SHLD    TEMP1
26700          LHLD    XINC1
26800          CALL    ROTH
26900          CALL    CHL
27000  FCNR:   SHLD    YINC1
27100          LHLD    TEMP1
27200          SHLD    XINC1
27300  FCNR1:  LDA     FSTP
27400          CPI     1           ;DEAD FLIPPER?
27500          JZ      FCNR2       ;YES
27600          MVI     L,FVEL1     ;NO, OFFSET VELOCITIES
27700          MVI     H,FVEL2
27800          CALL    CHL
27900          XCHG
28000          LHLD    YINC1
28100          DAD     D
28200          SHLD    YINC1
28300          JMP     COINR
28400  FCNR2:  LDA     NBLLY2      ;DEAD FLIPPER
28500          DCR     A           ;OFFSET POSITION
28600          STA     NBLLY2
28700  COINR:  NOP
28800  ;
28900  ;       TARGET MODULE
29000  ;
29100          MVI     A,TRGT1X
29200          STA     TGTX
29300          MVI     A,TRGT1Y
29400          STA     TGTY
29500          MVI     A,08H
29600          STA     TGTH
29700          STA     TGTW
29800          CALL    TRGT
29900          MVI     A,TRGT2X
30000          STA     TGTX
30100          MVI     A,TRGT2Y
30200          STA     TGTY
30300          CALL    TRGT
30400          MVI     A,TRGT3X
30500          STA     TGTX
30600          MVI     A,TRGT3Y
30700          STA     TGTY
```

```
30800           CALL    TRGT
30900           LDA     TRGT4X
31000           STA     TGTX
31100           LDA     TRGT4Y
31200           STA     TGTY
31300           CALL    TRGT
31400           JMP     WALLS
31500   ;       ROTH ROUTINE TAKES CONTENTS OF H,L REGS; ROTATES
31600   ;               LEFT WITH CARRY;
31700   ROTH:   ANI     0               ;CLEAR CARRY
31800           MOV     A,L
31900           RAL
32000           MOV     L,A
32100           MOV     A,H
32200           RAL
32300           MOV     H,A
32400           RET
32500   ;
32600   ;       RTH ROUTINE TAKES CONTENTS OF H,L REGS
32700   ;               ROTATES RIGHT WITH CARRY
32800   RTH:    MOV     A,H
32900           CPI     10000000B       ; POSITIVE NUMBER?
33000           JC      RTH1            ; YES
33100           STC                     ; NO, SET CARRY
33200           JMP     RTH2
33300   RTH1:   ANI     0
33400   RTH2:   MOV     A,H
33500           RAR
33600           MOV     H,A
33700           MOV     A,L
33800           RAR
33900           MOV     L,A
34000           RET
34100           NOP
34200           NOP
34300           NOP
34400           NOP
34500           NOP
34600           NOP
34700           NOP
34800           NOP
34900   ;
35000   ;
35100   ;
35200   ;       DSUB SUBTRACTS D,E REGS FROM H,L REGS;
35300   ;               RESULTS TO H,L REGS.
35400   ;
35500   DSUB:   ANI     0
35600           MOV     A,L
35700           SBB     E
35800           MOV     L,A
35900           MOV     A,H
36000           SBB     D
36100           MOV     H,A
36200           RET
36300   ;
36400   ;
36500   ;       CHL PERFORMS 2'S COMPLEMENT ON H,L REGS.
36600   ;
36700   CHL:    MOV     A,L
36800           CMA
```

```
36900           MOV     L,A
37000           MC      A,H
37100           CMA
37200           MOV     H,A
37300           MVI     D,0
37400           MVI     E,1
37500           DAD     D
37600           RET

00100   ;
00200   ;
00300   ;                                       - PGM 4 -
00400   ;
00500           IF      VER
00600           ORG     0C00H
00700           ENDIF
00800           IF      VER-1
00900           ORG     0F800H
01000           ENDIF
01100   ;
01200   ;
01300   ;
01400   ;       TARGET  SUBROUTINE
01500   ;
01600   TRGT:   LDA     NBLLX2
01700           MOV     B,A
0180            LDA     TGTX
01900           SUB     B
02000           STA     TX
02100           JNC     TRGT34
02200   TRGT12: LDA     NBLLY2
02300           MOV     B,A
02400           LDA     TGTY
02500           SUB     B
02600           STA     TY
02700           JNC     TRGT1
02800           JMP     TRGT2
02900   TRGT34: LDA     NBLLY2
03000           MOV     B,A
03100           LDA     TGTY
03200           SUB     B
03300           STA     TY
03400           JC      TRGT3
03500           JMP     TRGT4
03600   TRGT1:  LDA     TX
03700           CMA
03800           INR     A
03900           MOV     B,A
04000           LDA     TGTW
04100           CMP     B
04200           JNC     TRGT1A
04300           JMP     TRGTR
04400   TRGT1A: LDA     TY
04500           MOV     B,A
04600           LDA     BLLH
04700           CMP     B
04800           JNC     TRGTX           ;HIT
04900           JMP     TRGTR
05000   TRGT2:  LDA     TX
05100           CMA
05200           INR     A
```

```
05300           MOV     B,A
05400           LDA     TGTW
05500           CMP     B
05600           JNC     TRGT2A
05700           JMP     TRGTR
05800   TRGT2A: LDA     TY
05900           CMA
06000           INR     A
06100           MOV     B,A
06200           LDA     TGTH
06300           CMP     B
06400           JNC     TRGTX           ;HIT
06500           JMP     TRGTR
06600   TRGT3:  LDA     TX
06700           MOV     B,A
06800           LDA     TGTW
06900           CMP     B
07000           JNC     TRGT3A
07100           JMP     TRGTR
07200   TRGT3A: LDA     TY
07300           CMA
07400           INR     A
07500           MOV     B,A
07600           LDA     TGTH
07700           CMP     B
07800           JNC     TRGTX
07900           JMP     TRGTR
08000   TRGT4:  LDA     TX
08100           MOV     B,A
08200           LDA     BLLW
08300           CMP     B
08400           JNC     TRGT4A
08500           JMP     TRGTR
08600   TRGT4A: LDA     TY
08700           MOV     B,A
08800           LDA     BLLH
08900           CMP     B
09000           JNC     TRGTX
09100           JMP     TRGTR
09200   TRGTX:  ANI     0
09300           LDA     TGTW
09400           RAR
09500           MOV     B,A
09600           LDA     TGTX
09700           ADD     B
09800           STA     BUMPX
09900           LDA     TGTH
10000           RAR
10100           MOV     B,A
10200           LDA     TGTY
10300           ADD     B
10400           STA     BUMPY
10500           MVI     A,1
10600           STA     BASX
10700           CALL    BUMP
10800           LDA     SOUND
10900           ORI     00000010B
11000           STA     SOUND
11100   TRGTR:  RET
11200   ;
11300   ;
11400   ;
```

```
11500 ;              BUMP SUBROUTINE
11600 ;
11700 ;     ACCEPTS BUMPX,BUMPY ( CENTROIDAL COORDINATES OF
11800 ;     BUMPER ) AND UPDATES BALL VELOCITY.
11900 ;
12000 ;         .                    .
12100 ;          .                    .
12200 ;           .                    .
12300 ;            .                    .
12400 ;             .                    .
12500 ;              .                    .
12600 ;               .                    .
12700 ;                .                  .
12800 ;                 .                .
12900 BUMP:   ANI    0
13000         LDA    BASX
13100         MOV    C,A
13200         MVI    B,2
13300         LDA    PBLLX
13400         ADD    B
13500         MOV    B,A
13600         LDA    BUMPX
13700         SUB    B
13800 BUMP1:  DCR    C           ; SCALE AXES
13900         JZ     BUMP2
14000         RAL
14100         JMP    BUMP1
14200 BUMP2:  STA    BX
14300         MVI    B,2
14400         LDA    PBLLY
14500         ADD    B
14600         MOV    B,A
14700         LDA    BUMPY
14800         SUB    B
14900         STA    BY
15000         LDA    BX
15200         JC     SR134       ;NO
15300         JMP    SR123       ;YES
15400 SR134:  LDA    BY
15500         CPI    80H         ;NEG?
15600         JC     SR14        ;NO
15700         JMP    SR34        ;YES
15800 SR123:  LDA    BY
15900         CPI    80H         ;NEG?
16000         JC     SR12        ;NO
16100         JMP    SR23
16200 SR14:   MOV    B,A
16300         LDA    BX
16400         SUB    B
16500         CPI    80H         ;NEG?
16600         JC     SR4         ;NO
16700         JMP    SR1         ;YES
16800 SR34:   MOV    B,A
16900         LDA    BX
17000         ADD    B
17100         CPI    80H         ;NEG?
17200         JC     SR4         ;NO
17300         JMP    SR3         ;YES
17400 SR12:   LDA    BX
17500         MOV    B,A
17600         LDA    BY
```

```
17700           ADD     B
17800           CPI     80H             ;NEG
17900           JC      SR1             ;NO
18000           JMP     SR2             ;YES
18100   SR23:   MOV     B,A
18200           LDA     BX
18300           CMA
18400           INR     A
18500           ADD     B
18600           CPI     80H             ;NEG
18700           JC      SR2             ;NO
18800           JMP     SR3             ;YES
18900   SR1:    LDA     YINC2           ;RISING BALL?
19000           CPI     80H
19100           JC      SR1A            ;NO
19200           JMP     BUMPR           ;YES
19300   SR1A:   LHLD    YINC1
19400           CALL    ROTH
19500           CALL    CHL
19600           SHLD    YINC1
19700           JMP     BUMPR
19800   SR2:    LDA     XINC2
19900           CPI     80H             ;LEFT MOVING BALL?
20000           JC      BUMPR                   ;NO
20100           LHLD    XINC1           ;YES
20200           CALL    ROTH
20300           CALL    CHL
20400           SHLD    XINC1
20500           JMP     BUMPR
20600   SR3:    LDA     YINC2           ;RISING BALL?
20700           CPI     80H
20800           JC      BUMPR           ;NO
20900           LHLD    YINC1           ;YES
21000           CALL    ROTH
21100           CALL    CHL
21200           SHLD    YINC1
21300           JMP     BUMPR
21400   SR4:    LDA     XINC2
21500           CPI     80H             ;LEFT MOVING BALL?
21600           JC      SR4A            ;NO
21700           JMP     BUMPR           ;YES
21800   SR4A:   LHLD    XINC1
21900           CALL    ROTH
22000           CALL    CHL
22100           SHLD    XINC1
22200   BUMPR:  RET
22300   ;
22400   ;
22500           ;******** WALL BOUNDRY INTERACTION MODULE **********
22600           ;
22700           ;
22800           ;=============== PROGRAM VARIABLE LIST ===============
22900           ;
23000           ; OXINC         OLD VALUE OF X POSITION INCREMENT
23100           ;
23200           ;
23300           ; OYINC         OLD VALUE OF Y POSITION INCREMENT
23400           ;
23500           ; RADX          X COMPONENT OF PINBALL RACE RADIUS
23600           ;
```

```
23700            ; SOUND      INDIVIDUAL BITS OF THIS BYTE USED TO
23800            ;            TURN GAME SOUNDS ON AND OFF. BIT8 IS
23900            ;            USED BY THIS BOUNDRY INTERACTION MODULE.
24000            ;
24100            ;========================================================
24200            ;
24300                                      ; IF BARACE OR BEXIT = 0H THEN
24400                                      ; BALL IN ACTIVE PLAY AREA.....
24500                                      ; DO (THIS MODULE)
24600   WALLS:   LXI    H,BEXIT
24700            LDA    BARACE
24800            ORA    M
24900            CPI    0H
25000            JNZ    WPT22
25100                                      ;   OXINC = XINC
25200            LHLD   XINC1
25300            SHLD   OXINC
25400                                      ;   OYINC = YINC
25500            LHLD   YINC1
25600            SHLD   OYINC
25700                                      ;   IF OBLLY <= VBL-53H THEN
25800            MVI    A,VBL-53H
25900            LXI    H,OBLLY
26000            CMP    M
26100            JC     WPT1
26200                                      ;     DO
26300                                      ;       IF OBLLX > HBL-47H THEN
26400                                      ;         RADX = OBLLX - (HBL-47H)
26500            MVI    A,HBL-47H
26600            LXI    H,OBLLX
26700            CMP    M
26800            JNC    WPT2
26900            LDA    OBLLX
27000            SUI    HBL-47H
27100            STA    RADX
27200            JMP    WPT3
27300                                      ;       ELSE RADX = (HBL-47H) - OBLLX
27400   WPT2:    LXI    H,OBLLX
27500            MVI    A,HBL-47H
27600            SUB    M
27700            STA    RADX
27800                                      ;       IF (RADX)*(RADX)+[(HBL-53H)-OBLLY]*[(HBL-53H)-OBLLY]
27900                                      ;          >1600H THEN
28000   WPT3:    LHLD   RADX
28100            MVI    H,0
28200            XCHG
28300            LHLD   RADX
28400            MVI    H,0
28500            CALL   SUB34
28600            PUSH   H
28700            LXI    H,OBLLY
28800            MVI    A,VBL-53H
28900            SUB    M
29000            MOV    E,A
29100            MVI    D,0
29200            MOV    L,A
29300            MVI    H,0
29400            CALL   SUB34
29500            POP    B
29600            DAD    B
29700            LXI    D,1600H
```

```
29800           CALL    SUB95
29900           JNC     WPT4
30000                                   ;           DO
30100                                   ;             IF OBLLY>VBL-72H THEN
30200           MVI     A,VBL-72H
30300           LXI     H,OBLLY
30400           CMP     M
30500           JNC     WPT5
30600                                   ;               DO
30700                                   ;                 XINC = -XINC
30800           LHLD    XINC1
30900           CALL    SUB41
31000           SHLD    XINC1
31100                                   ;                 CALL RBND
31200           CALL    RBND
31300                                   ;               END
31400           JMP     WPT6
31500                                   ;             ELSE
31600                                   ;               DO
31700                                   ;                 IF OBLLY > VBL-9AH THEN CALL ZB (ZONE B)
31800  WPT5:    MVI     A,VBL-9AH
31900           LXI     H,OBLLY
32000           CMP     M
32100           JNC     WPT7
32200           CALL    ZB
32300           JMP     WPT8
32400                                   ;                 ELSE
32500                                   ;                   DO
32600                                   ;                     YINC = -(.75)*YINC
32700  WPT7:    LHLD    YINC1
32800           CALL    TQV
32900           SHLD    YINC1
33000                                   ;                     NBLLY2 = NBLLY2 + 3
33100           LXI     H,NBLLY2
33200           INR     M
33300           INR     M
33400           INR     M
33500                                   ;                   END
33600                                   ;               END
33700  WPT8:    NOP
33800                                   ;             END
33900  WPT6:    NOP
34000                                   ;           END
34100  WPT4:    JMP     WPT9
34200                                   ;         ELSE
34300                                   ;           DO
34400                                   ;             IF OBLLY < VBL-0EH THEN
34500  WPT1:    LDA     OBLLY
34600           CPI     VBL - 0EH
34700           JNC     WPT10
34800                                   ;               DO
34900                                   ;                 IF OBLLX < HBL-92H (LEFT D ZONE WALL) THEN
35000           LDA     OBLLX
35100           CPI     HBL-92H
35200           JNC     WPT18
35300                                   ;                   DO
35400                                   ;                     IF XINC2 NEG THEN XINC = -XINC
35500           LHLD    XINC1
35600           MOV     A,H
35700           RAL
35800           JNC     WPT1A
```

```
35700           CALL    SUB41
36000           SHLD    XINC1
36100                                   ;           CALL RBND
36200   WPT1A:  CALL    RBND
36300                                   ;       END
36400           JMP     WPT19
36500                                   ;   ELSE DO
36600                                   ;       IF OBLLX > HBL+3H THEN
36700   WPT18:  MVI     A,HBL+3H
36800           LXI     H,OBLLX
36900           CMP     M
37000           JNC     WPT20
37100                                   ;           DO
37200                                   ;               IF XINC2 POS THEN XINC = -XINC
37300           LHLD    XINC1
37400           MOV     A,H
37500           RAL
37600           JC      WPT18A
37700           CALL    SUB41
37800           SHLD    XINC1
37900                                   ;           CALL RBND
38000   WPT18A: CALL    RBND
38100                                   ;           END
38200                                   ;       END
38300   WPT20:  NOP
38400                                   ;   END
38500   WPT19:  NOP
38600           JMP     WPT17
38700                                   ;   ELSE IF OBLLY < VBL - 4H THEN
38800   WPT10:  LDA     OBLLY
38900           CPI     VBL-4H
39000           JNC     WPT14
39100                                   ;       DO
39200                                   ;           IF OBLLX < HBL-6AH THEN
39300           LDA     OBLLX
39400           CPI     HBL-6AH
39500           JNC     WPT11
39600                                   ;           DO
39700                                   ;               IF 4*[OBLLY-(VBL-0AH)]>[OBLLX-(HBL-92H)] THEN
39800           LDA     OBLLY
39900           SUI     VBL-0AH
40000           MOV     L,A
40100           MVI     H,0
40200           DAD     H
40300           DAD     H
40400           PUSH    H
40500           LDA     OBLLX
40600           SUI     HBL-92H
40700           POP     H
40800           CALL    SUB94
40900           JNC     WPT12
41000                                   ;               DO
41100                                   ;                   IF YINC POS THEN YINC = -(.75)*YINC
41200           LHLD    YINC1
41300           MOV     A,H
41400           RAL
41500           JC      WPT10A
41600           CALL    TQV
41700           SHLD    YINC1
41800                                   ;               CALL RBND
41900   WPT10A: CALL    RBND
```

```
42000                            ;              NBLLY2 = NBLLY2 - 1
42100        LXI   H,NBLLY2
42200        DCR   M
42300                            ;              XINC = XINC + 00,20H
42400        LHLD  XINC1
42500        MVI   D,0H
42600        MVI   E,20H
42700        DAD   D
42800        SHLD  XINC1
42900                            ;           END
43000                            ;         END
43100 WPT12: JMP   WPT13         ;         ELSE
43200                            ;         DO
43300                            ;
43400                            ;           IF OBLLX > HBL-22H THEN
43500 WPT11: MVI   A,HBL-22H
43600        LXI   H,OBLLX
43700        CMP   M
43800        JNC   WPT14
43900                            ;           DO
44000                            ;             IF 4*[OBLLY-(VBL-0AH)]>
44100                            ;             [(HBL-12H)-OBLLX] THEN
44200        LDA   OBLLY
44300        SUI   VBL-0AH
44400        MOV   L,A
44500        MVI   H,0
44600        DAD   H
44700        DAD   H
44800        PUSH  H
44900        LXI   H,OBLLX
45000        MVI   A,HBL-12H
45100        SUB   M
45200        POP   H
45300        CALL  SUB94
45400        JNC   WPT15
45500                            ;             DO
45600                            ;               IF YINC POS THEN YINC=-(.75)XYINC
45700        LHLD  YINC1
45800        MOV   A,H
45900        RAL
46000        JC    WPT11A
46100        CALL  TQV
46200        SHLD  YINC1
46300                            ;               CALL RBND
46400 WPT11A: CALL RBND
46500                            ;               NBLLY2 = NBLLY2 - 1
46600        LXI   H,NBLLY2
46700        DCR   M
46800                            ;               XINC = XINC - 00,20 (FF,CF)
46900        LHLD  XINC1
47000        MVI   D,0FFH
47100        MVI   E,0CFH
47200        DAD   D
47300        SHLD  XINC1
47400                            ;             END
47500                            ;           END
47600 WPT15: NOP
47700                            ;         END
47800 WPT14: NOP
47900                            ;         IF OBLLY > VBL-7H AND (OBLLX < HBL-65H OR
48000                            ;         OBLLX > HBL-1CH) THEN
```

```
48100           MVI     A,VBL-7H
48200           LXI     H,OBLLY
48300           SUB     M
48400           SBB     A
48500           MOV     C,A
48600           LXI     H,OBLLX
48700           MOV     A,M
48800           SUI     HBL-65H
48900           SBB     A
49000           MOV     B,A
49100           MVI     A,HBL-1CH
49200           SUB     M
49300           SBB     A
49400           ORA     B
49500           ANA     C
49600           RAR
49700           JNC     WPT13
49800                                   ;                       XINC =-XINC
49900           LHLD    XINC1
50000           CALL    SUB41
50100           SHLD    XINC1
50200           CALL    RBND
50300                                   ;               IF OBLLY>VBL+20H THEN
50400   WPT13:  MVI     A,VBL+20H
50500           LXI     H,OBLLY
50600           CMP     M
50700           JNC     WPT17
50800           LXI     H,BEXIT
50900                                   ;                       DO
51000                                   ;                           BEXIT = 1
51100           MVI     M,1H
51200                                   ;                           BARACE = 1
51300           LXI     H,BARACE
51400           MVI     M,1H
51500                                   ;                       END
51600                                   ;               END
51700                                   ;       END
51800   WPT17:  NOP
51900                                   ;   IF OXINC<>XINC THEN SOUND = SOUND OR BIT8
52000   WPT9:   LXI     B,XINC1
52100           LXI     D,OXINC
52200           CALL    SUB98
52300           ORA     L
52400           JZ      WPT21
52500           LDA     BIT8
52600           LXI     H,SOUND
52700           ORA     M
52800           MOV     M,A
52900                                   ;   IF OYINC<>YINC THEN SOUND = SOUND OR BIT8
53000   WPT21:  LXI     B,YINC1
53100           LXI     D,OYINC
53200           CALL    SUB98
53300           ORA     L
53400           JZ      WH1
53500           LDA     BIT8
53600           LXI     H,SOUND
53700           ORA     M
53800           MOV     M,A
53900                                   ;       TEST TRAP
54000           LDA     SOUND
54100           ANI     80H
```

```
54200           CPI     80H
54300           JNZ     WH1
54400           LDA     WHIT
54500           CPI     1H
54600           JZ      WH2
54700           MVI     A,1
54800           STA     WHIT
54900           JMP     WH3
55000
55100   WH2:    LDA     OBLLY
55200           CPI     VBL-0EH
55300           JC      WH3
55400           LXI     H,NBLLY2
55500           DCR     M
55600           DCR     M
55700           DCR     M
55800           DCR     M
55900           JMP     WH3
56000   WH1:    MVI     A,0H
56100           STA     WHIT
56200   WH3:    NOP
56300                                   ;
56400                                   ; END MAIN
56500   WPT22:  JMP     WPT23
56600                                   ;

00100                                   ;
00200                                   ;
00300           IF      VER
00400           ORG     1000H
00500           ENDIF
00600           IF      VER-1
00700           ORG     0FC00H
00800           ENDIF
00900                                   ;
01000                                   ;================ ZB (ZONE B) ==========================
01100                                   ;
01200                                   ; IF OBLLX > HBL - 47H THEN
01300   ZB:     MVI     A,HBL-47H
01400           LXI     H,OBLLX
01500           CMP     M
01600           JNC     ZB1
01700                                   ;   DO
01800                                   ;     IF (((NOT XINC2) AND YINC2 AND 80H) = 80H) AND (XINC1 > YINC1)
01900                                   ;     THEN XINC = -XINC
02000           LDA     XINC2
02100           CMA
02200           LXI     H,YINC2
02300           ANA     M
02400           ANI     80H
02500           SUI     80H
02600           SUI     1
02700           SBB     A
02800           LXI     D,YINC1
02900           LXI     B,XINC1
03000           PUSH    PSW
03100           CALL    SUB98
03200           SBB     A
03300           POP     B
03400           MOV     C,B
03500           ANA     C
```

```
03500           RAR
03700           JNC     ZB2
03800           LHLD    XINC1
03900           CALL    SUB41
04000           SHLD    XINC1
04100   ZB2:    JMP     ZB3
04200
04300                                   ; END
04400                                   ; ELSE
                                        ;   DO
04500                                   ;     XINC = -XINC
04600   ZB1:    LHLD    XINC1
04700           CALL    SUB41
04800           SHLD    XINC1
04900                                   ;     YINC = -YINC
05000           LHLD    YINC1
05100           CALL    SUB41
05200           SHLD    YINC1
05300                                   ;   END
05400                                   ; TEMP1 = XINC
05500   ZB3:    LHLD    XINC1
05600           SHLD    TEMP1
05700                                   ; XINC = YINC
05800           LHLD    YINC1
05900           SHLD    XINC1
06000                                   ; YINC = TEMP1
06100           LHLD    TEMP1
06200           SHLD    YINC1
06300                                   ; CALL RBND
06400           CALL    RBND
06500           RET
06600                                   ;
06700                                   ;============= END ZB SUBROUTINE =============================
06800                                   ;
06900                                   ;================ RBND (REBOUND) SUBROUTINE ================
07000                                   ;
07100                                   ; NBLLY1 = NBLLY1 + YINC1
07200   RBND:   LHLD    NBLLY1
07300           XCHG
07400           LHLD    YINC1
07500           DAD     D
07600           SHLD    NBLLY1
07700                                   ; NBLLX1 = NBLLX1 + XINC1
07800           LHLD    NBLLX1
07900           XCHG
08000           LHLD    XINC1
08100           DAD     D
08200           SHLD    NBLLX1
08300           RET
08400                                   ;
08500                                   ;==================== END RBND ====================================
08600                                   ;
08700                                   ;======== T3V THREE QUARTERS VELOCITY ========================
08800                                   ;
08900                                   ;   VALUE IN H & L IS MULTIPLIED BY -(3/4)
09000                                   ;
09100   T3V:    MOV     D,H
09200           MOV     E,L
09300           CALL    RTH
09400           CALL    RTH
09500           XCHG
09600           CALL    SUB41
```

```
09700           DAD     D
09800           RET
09900                           ;
10000                           ;==================== END TRV ====================================
10100                           ;
10200   SUB34:  MOV     B,A
10300           MOV     C,L
10400   SUB35:  LXI     H,0
10500           MVI     A,16
10600           DAD     H
10700           XCHG
10800           DAD     H
10900           XCHG
11000           JNC     $+4H
11100           DAD     B
11200           DCR     A
11300           JNZ     $-9H
11400   PL4:    RET
11500                           ;
11600                           ;
11700   SUB41:  SUB     A
11800           SUB     L
11900           MOV     L,A
12000           MVI     A,0
12100           SBB     H
12200           MOV     H,A
12300           RET
12400                           ;
12500                           ;
12600   SUB94:  MOV     E,A
12700           MVI     D,0
12800   SUB95:  MOV     A,E
12900           SUB     L
13000           MOV     L,A
13100           MOV     A,D
13200           SBB     H
13300           MOV     H,A
13400           RET
13500                           ;
13600                           ;
13700   SUB96:  MOV     C,A
13800           MVI     B,0
13900   SUB97:  MOV     A,E
14000           SUB     C
14100           MOV     L,A
14200           MOV     A,D
14300           SBB     B
14400           MOV     H,A
14500           RET
14600                           ;
14700                           ;
14800   SUB98:  MOV     L,C
14900           MOV     H,B
15000   SUB99:  MOV     C,M
15100           INX     H
15200           MOV     B,M
15300   SUB100: LDAX    D
15400           SUB     C
15500           MOV     L,A
15600           INX     D
15700           LDAX    D
```

```
15900           SBB     B
15900           MOV     H,A
16000           RET
16100                                   ;
16200   WPT23:  NOP
16300                                   ;
16400                                   ;================== SPEED LIMIT ROUTINE ====================
16500                                   ; LIMITS MAXIMUM BALL VELOCITY IN EACH DIRECTION TO 'LIMIT'
16600                                   ;
16700   SLR:    LXI     H,LIMIT
16800           MOV     C,M
16900           LXI     H,XINC2
17000           MOV     B,M
17100           CALL    LT
17200           MOV     M,B
17300           LXI     H,LIMIT
17400           MOV     C,M
17500           LXI     H,YINC2
17600           MOV     B,M
17700           CALL    LT
17800           MOV     M,B
17900           JMP     SCORE
18000                                   ;
18100                                   ;================== END  SLR ==============================
18200                                   ;
18300                                   ;
18400                                   ;================== LIMIT TEST ROUTINE ====================
18500                                   ;
18600                                   ; INPUT PARAMETER VALUES IN B & C REGISTER
18700                                   ; VALUE IN B REGISTER MAY BE POSITIVE OR NEGATIVE(BIT 8 = 1)
18800                                   ; VALUE IN C REGISTER IS POSITIVE LIMIT VALUE
18900                                   ; IF B NEGATIVE AND < -C THEN B = -C
19000                                   ; IF B POSITIVE AND  B > C THEN B = C
19100                                   ;    OTHERWISE B REMAINS UNCHANGED
19200                                   ;
19300                                   ;
19400   LT:     MOV     A,B
19500           RAL
19600           JNC     LT1             ; POS NO. IN B
19700           MOV     A,C             ; NEG NO. IN B, FORM 2'S COMPLIMENT OF C
19800           CMA
19900           INR     A
20000           MOV     C,A             ; AND RETURN 2'S COMPLIMENT VALUE TO C
20100           MOV     A,B
20200           CMP     C
20300           JNC     LT2             ; JUMP IF -C < -B
20400           MOV     B,C             ; B = -C
20500           JMP     LT2             ; JUMP RETURN
20600   LT1:    MOV     A,C
20700           CMP     B             ; COMPARE B & C
20800           JNC     LT2             ; JUMP IF C < B
20900           MOV     B,C             ; B = C
21000   LT2:    RET
21100           NOP
21200           NOP
21300           NOP
21400           NOP
21500                                   ;==================== END LIMIT TEST========================
21600                                   ;
21700                                   ;
21800           ;**************** END WALL BOUNDRY INTERACTION MODULE ******************
```

```
21900
22000                ;
22100     ;
22200     ;
22300     ;
22400     ;    THIS ROUTINE EXAMINES THE BYTE 'SOUND' AND IF PARTICULAR BITS WITHIN THE
22500     ; SOUND BYTE ARE SET (INDICATING BALL/BUMPER COLLISIONS), THEN SCORING WILL BE
22600     ; UPDATED. SCORING IS MAINTAINED IN BCD FORMAT, 2 BCD DIGITS IN EACH OF TWO BYTES:
22700     ; 'NSCORE' AND 'NSCORE' + 1. VAL1,VAL2,VAL3, CONTAIN POINT AWARDS FOR VARIOUS
22800     ; BUMPER HITS.
22900     ;
23000 SCORE:  LDA    SOUND         ; DO SCORE UPDATE. TEST SOUND BIT 2, (WIPE-OUT)
23100         MOV    B,A
23200         ANI    2H
23300         CPI    2H
23400         JNZ    SC2           ; BIT2 SET ?
23500         LHLD   VAL1          ; YES, UPDATE SCORE
23600         XCHG                 ; PLACE INCREMENTAL SCORE IN D&E
23700         CALL   ASCOR
23800 SC2:    MOV    A,B           ; TEST SOUND BIT 3 (ACTIVE NUMBER)
23900         ANI    4H
24000         CPI    4H
24100         JNZ    SC3           ; BIT3 SET ?
24200         ANI    0H            ; YES, CLEAR CARRY
24300         LDA    A2            ; AND GET BUMPER NUMBER
24400         SUI    5H            ; SUBTRACT 5 TO GET BCD
24500         RLC                  ; MULTIPLY BY 10 (SHIFT BCD BYTE LEFT 4 BITS)
24600         RLC
24700         RLC
24800         RLC
24900         MOV    E,A           ; PLACE INCREMENTAL SCORE IN E AND
25000         MVI    D,0           ; ZERO D REG.
25100         CALL   ASCOR
25200         LDA    A2            ; IF BUMPER NUMBER <> 9 THEN INCREMENT
25300         CPI    0EH           ; E = 9 + 5(OFFSET)
25400         JZ     SC3
25500         INR    A
25600         STA    A2
25700 SC3:    MOV    A,B           ; TEST SOUND BIT 4
25800         ANI    8H
25900         CPI    8H
26000         JNZ    SC4           ; BIT4 SET ?
26100         LHLD   VAL2          ; YES, UPDATE SCORE
26200         XCHG
26300         CALL   ASCOR
26400 SC4:    MOV    A,B           ; TEST SOUND BIT 5
26500         ANI    10H
26600         CPI    10H
26700         JNZ    SC5           ; BIT5 SET ?
26800         LHLD   VAL3          ; YES, UPDATE SCORE
26900         XCHG
27000         CALL   ASCOR
27100 SC5:    LHLD   NSCOR         ; UNPACK 'NSCOR' AND UPDATE DISPLAY TABLE
27200         MOV    A,L
27300         ANI    0FH
27400         ADI    5H
27500         STA    A11
27600         MOV    A,L
27700         RAR
27800         RAR
27900         RAR
```

```
28000           RAR
28100           ANI     0FH
28200           ADI     5H
28300           STA     A10
28400           MOV     A,H
28500           ANI     0FH
28600           ADI     5H
28700           STA     A9
28800           MOV     A,H
28900           RAR
29000           RAR
29100           RAR
29200           RAR
29300           ANI     0FH
29400           ADI     5H
29500           STA     A8
29600           JMP     SC6
29700                                   ;
29800                                   ;
29900   ASCOR:  LHLD    NSCOR           ; ADD INCREMENTAL SCORE (IN BCD) ROUTINE
30000                                   ; VALUE TO BE ADDED TO NSCOR PASSED IN DE
30100           DAD     D
30200           ORI     0H              ; CLEAR CY AND AC FLAGS
30300           MOV     A,L
30400           DAA
30500           JNC     AS1             ; CARRY FROM 2ND NIBBLE ?
30600           INR     H               ; YES, INCREMENT 3RD NIBBLE
30700   AS1:    MOV     L,A
30800                                   ; IF NIBBLE 3 > 9H THEN SET GFLAG = 1
30900           MOV     A,H
31000           ANI     0FH
31100           CPI     0AH
31200           JC      AS2
31300           MVI     A,1H
31400           STA     GFLAG1
31500   AS2:    ORI     0H              ; CLEAR CY AND AC FLAGS
31600           MOV     A,H
31700           DAA
31800           MOV     H,A
31900           SHLD    NSCOR
32000           RET
32100                                   ;
32200   ;======================= END SCORE ROUTINE =======================================
32300   SC6:    NOP
32400                                   ;
32500   ;=========================== SOUND MODULE ===============================
32600           ;
32700           ;
32800   ;********************* PARAMETER LIST ****************************
32900           ;
33000           ; N             LOOP COUNTER FOR WORKING WITH TIMER ARRAY COUNT(N)
33100           ;
33200           ; SBIT          'SHIFT BIT' BYTE CONTAINING LOGIC 1 AT RIGHT-MOST BIT
33300           ;               AT START OF LOOP AND SHIFTED LEFT ONE BIT FOR EACH
33400           ;               PASS THRU LOOP.
33500           ;
33600           ; SOUT          BYTE SENT TO I/O PORT DEFINING WHICH BITS ARE SET TO 1
33700           ;
33800           ; COUNT(8)      EIGHT BYTE ARRAY USED TO TIME DURATION OF EACH BIT
33900           ;               SET TO LOGIC 1 ON I/O PORT.
34000           ;
```

```
34100          ; INIT(8)     EIGHT BYTE ARRAY DEFINING INITIAL COUNTS FOR TIME DURATION
34200          ;
34300          ; SOUND       BITS SET TO ONE IN THIS BYTE WILL RESULT IN THIS MODULE
34400          ;             SETTING CORRESPONDING BIT ON I/O PORT TO LOGIC 1.
34500          ;
34600          ;****************************************************************
34700          ;
34800          ;
34900                                    ;
35000                                    ;
35100                                    ; SBIT = 01H
35200   SND:   LXI     H,SBIT
35300          MVI     M,1H
35400                                    ; N = 1
35500          LXI     H,N
35600          MVI     M,1H
35700                                    ; DO WHILE N < 9
35800   SND5:  LDA     N
35900          CPI     9H
36000          JNC     SND6
36100                                    ;   IF (SBIT AND SOUND) > 0 THEN
36200          LDA     SOUND
36300          LXI     H,SBIT
36400          ANA     M
36500          MOV     C,A
36600          MVI     A,0H
36700          CMP     C
36800          JNC     SND1
36900                                    ;     DO
37000                                    ;       COUNT(N) = INIT(N)
37100          LXI     H,N
37200          MOV     E,M
37300          DCR     E
37400          MVI     D,0H
37500          LXI     H,INIT
37600          DAD     D
37700          MOV     A,M
37800          LXI     H,COUNT
37900          DAD     D
38000          MOV     M,A
38100                                    ;       SOUND = SOUND AND NOT SBIT
38200          LDA     SBIT
38300          CMA
38400          LXI     H,SOUND
38500          ANA     M
38600          MOV     M,A
38700                                    ;       SOUT = SOUT OR SBIT
38800          LXI     H,SOUT
38900          LDA     SBIT
39000          ORA     M
39100          STA     SOUT
39200                                    ;     END
39300          JMP     SND2
39400                                    ;   ELSE
39500                                    ;     DO
39600                                    ;       IF COUNT(N) > 0 THEN COUNT(N) = COUNT(N)-1
39700   SND1:  LHLD    N
39800          MVI     H,0
39900          LXI     B,COUNT
40000          DAD     B
```

```
40100           MVI     A,CH
40200           CMP     M
40300           JNC     SND3
40400           DCR     M
40500           JMP     SND4
40600                           ;       ELSE SOUT = SOUT AND NOT SBIT
40700  SND3:    LDA     SBIT
40800           CMA
40900           LXI     H,SOUT
41000           ANA     M
41100           MOV     M,A
41200                           ;       END
41300  SND4:    NOP
41400                           ;   SBIT = SHL(SBIT,1)
41500  SND2:    LDA     SBIT
41600           ADD     A
41700           STA     SBIT
41800                           ;   N = N + 1
41900           LXI     H,N
42000           INR     M
42100                           ; END
42200           JMP     SND5
42300                           ; OUTPUT(211) = SOUT
42400  SND6:    LDA     SOUT
42500           OUT     211D
42600                           ; END SND
42700                           ;
42800   ;=========================== END SOUND MODULE ===========================
42900           ;
43000                           ;
43100  TOM:     NOP
43200           IF      VER-1
43300                           ; ENABLE INTERRUPTS
43400           ENDIF
43500                           ;
43600                           ;
43700   ;
43800   ;
43900   ;                               BALL MOVEMENT
44000   ;
44100           LDA     BARACE  ;BALL IN RACE?
44200           CPI     0
44300           JNZ     MOVER   ;YES
44400           LHLD    NBLLY1  ;NO
44500           XCHG
44600           LHLD    YINC1
44700           DAD     D
44800           SHLD    NBLLY1
44900           LHLD    NBLLX1
45000           XCHG
45100           LHLD    XINC1
45200           DAD     D
45300           SHLD    NBLLX1
45400           LDA     NBLLX2
45500           STA     NBLLX
45600           LDA     NBLLY2
45700           STA     NBLLY
45800  MOVER:   NOP
45900  GHR:     NOP
46000  BUF:     LDA     VX      ;DATA BLOCK IN BUFFER?
```

```
46100            CPI     4
46200            JC      BUFR            ;NO
46300            LXI     D,VTR+2         ;YES, D AND E CONTAIN DATA ORIGINATION.
46400            LXI     H,BMPR
46500            ANI     0
46600            LDA     FIELD
46700            ANI     00000011
46800            RAL
46900            MOV     C,A
47000            MVI     B,0
47100            DAD     B               ;H AND L CONTAIN DATA DESTINATION
47200            LDAX    D
47300            INX     D
47400            XCHG
47500            STAX    D
47600            INX     D
47700            XCHG
47800            LDAX    D
47900            XCHG
48000            STAX    D
48100            LDA     BMPR
48200            LXI     H,BMPR+2
48300            MVI     B,3
48400    LOOP2:  CMP     M               ;ERROR FREE CODE?
48500            JNZ     BUFR            ;NO
48600            DCR     B
48700            INX     H
48800            INX     H
48900            JNZ     LOOP2
49000            LDA     BMPR+1
49100            LXI     H,BMPR+3
49200            MVI     B,3
49300    LOOP3:  CMP     M
49400            JNZ     BUFR            ;NO
49500            DCR     B
49600            INX     H
49700            INX     H
49800            JNZ     LOOP3
49900            LDA     BMPR            ;YES
50000            STA     TRGT4X
50100            LDA     BMPR+1
50200            STA     TRGT4Y
50300    BUFR:   JMP     BUFI

00100    ;
00200    ;
00300            ORG     01400H          ;       ROM6
00400    ;
00500    ;
00600    ;
00700    ;                                       PAGE 7
00800    ;       DATA TABLES
00900    ;
01000    BIT1:   DB      00000001B
01100    BIT2:   DB      00000010B
01200    BIT3:   DB      00000100B
01300    BIT4:   DB      00001000B
01400    BIT5:   DB      00010000B
01500    BIT6:   DB      00100000B
01600    BIT7:   DB      01000000B
01700    BIT8:   DB      10000000B
```

```
01800 ;
01900 CBIT1:  DB   11111110B
02000 CBIT2:  DB   11111101B
02100 CBIT3:  DB   11111011B
02200 CBIT4:  DB   11110111B
02300 CBIT5:  DB   11101111B
02400 CBIT6:  DB   11011111B
02500 CBIT7:  DB   10111111B
02600 CBIT8:  DB   01111111B
02700 ;
02800 LL:     DB   00H;           LL IS A5 OF 2108 AS SET BY INTEL SPEC
02900 ;
03000 ;
03100 ;
03200 ;
03300 DSPD:   DB   64D;           DISPLAY TABLE ALLOCATION
03400 BMPE:   DB   16             ;NO. OF BLOCKS ALLOCATED TO BUMPER TABLE
03500 OE:    DB   24D;           NO. OF BLOCKS IN DISPLAY TABLE
03600 AE:     DB   4
03700 GRAVP:  DB   1              ;GRAVITY PRESET
03800 ;            INITIAL VELOCITIES
03900 PVX:    DB   20H            ;LSB
04000         DB   00H            ;MSB
04100 NVX:    DB   0E0H           ;LSB
04200         DB   0FFH           ;MSB
04300 PVY:    DB   30H            ;LSB
04400         DB   00H            ;MSB
04500 LIMIT:  DB   04H
04600 ;
04700 ;            FLIPPER ORIGINS
04800 LFCX    EQU  056H
04900 LFCY    EQU  0ACH
05000 RFCX    EQU  09AH
05100 RFCY    EQU  0ACH
05200 VAL1:   DB   10H
05300 VAL1A:  DB   00H
05400 VAL2:   DB   25H
05500 VAL2A:  DB   00H
05600 VAL3:   DB   50H
05700 VAL3A:  DB   00H
05800 INIT:   DB   06H
05900         DB   06H
06000         DB   06H
06100         DB   06H
06200         DB   06H
06300         DB   06H
06400         DB   06H
06500         DB   06H
06600 ;
06700 ;            FLIPPER DELAY FACTORS
06800 FDNP:   DB   1D
06900 FOFFP:  DB   1D
07000 ;
07100 ALFHAC: DB   64
07200         DB   64
07300         DB   96
07400         DB   64
07500         DB   128
07600         DB   64
07700         DB   160
07800         DB   64
```

```
07900          DB     0
08000          DB     0
08100          DB     0
08200          DB     0
08300          DB     0
08400          DB     0
08500          DB     0
08600          DB     0
08700          DB     0
08800          DB     0
08900          DB     0
09000          DB     0
09100          DB     0
09200          DB     0
09300          DB     0
09400          DB     0
09500          DB     0
09600          DB     0
09700          DB     0
09800          DB     0
09900          DB     0
10000          DB     0
10100          DB     0
10200          DB     0
10300   ;
10400   ;
10500   CHAR:  DB     00H          ;ZERO
10600          DB     7FH
10700          DB     7FH
10800          DB     63H
10900          DB     63H
11000          DB     63H
11100          DB     7FH
11200          DB     7FH
11300          DB     00H          ;ONE
11400          DB     0CH
11500          DB     0CH
11600          DB     0CH
11700          DB     0CH
11800          DB     0CH
11900          DB     0CH
12000          DB     0CH
12100          DB     00H          ;TWO
12200          DB     7FH
12300          DB     7FH
12400          DB     03H
12500          DB     7FH
12600          DB     60H
12700          DB     7FH
12800          DB     7FH
12900          DB     00H          ;THREE
13000          DB     7FH
13100          DB     7FH
13200          DB     03H
13300          DB     7FH
13400          DB     03H
13500          DB     7FH
13600          DB     7FH
13700          DB     00H          ;FOUR
13800          DB     63H
13900          DB     63H
```

```
14000       DB      63H
14100       DB      7FH
14200       DB      03H
14300       DB      03H
14400       DB      03H
14500       DB      00H        ;FIVE
14600       DB      7FH
14700       DB      7FH
14800       DB      60H
14900       DB      7FH
15000       DB      03H
15100       DB      7FH
15200       DB      7FH
15300       DB      00H        ;SIX
15400       DB      60H
15500       DB      60H
15600       DB      60H
15700       DB      7FH
15800       DB      63H
15900       DB      7FH
16000       DB      7FH
16100       DB      00H        ;SEVEN
16200       DB      1FH
16300       DB      1FH
16400       DB      03H
16500       DB      03H
16600       DB      03H
16700       DB      03H
16800       DB      03H
16900       DB      00H        ;EIGHT
17000       DB      7FH
17100       DB      7FH
17200       DB      63H
17300       DB      7FH
17400       DB      73H
17500       DB      7FH
17600       DB      7FH
17700       DB      00H        ;NINE
17800       DB      7FH
17900       DB      7FH
18000       DB      63H
18100       DB      7FH
18200       DB      03H
18300       DB      03H
18400       DB      03H
18500   ;
18600   ;
18700   ;           NUMERICS
18800   ;
18900   ZERO:   DB      0FCH
19000       DB      090H
19100       DB      090H
19200       DB      090H
19300       DB      090H
19400       DB      090H
19500       DB      0F0H
19600       DB      000H
19700   ONE:    DB      040H
19800       DB      040H
19900       DB      040H
20000       DB      040H
```

```
20130         DB    040H
20200         DB    040H
20300         DB    040H
20400         DB    000H
20500  TWO:   DB    0F0H
20600         DB    010H
20700         DB    010H
20800         DB    0F0H
20900         DB    080H
21000         DB    080H
21100         DB    0F0H
21200         DB    000H
21300  THREE: DB    0F0H
21400         DB    010H
21500         DB    010H
21600         DB    070H
21700         DB    010H
21800         DB    010H
21900         DB    0F0H
22000         DB    000H
22100  FOUR:  DB    090H
22200         DB    090H
22300         DB    090H
22400         DB    0F0H
22500         DB    010H
22600         DB    010H
22700         DB    010H
22800         DB    000H
22900  FIVE:  DB    0F0H
23000         DB    080H
23100         DB    080H
23200         DB    0F0H
23300         DB    010H
23400         DB    010H
23500         DB    0F0H
23600         DB    000H
23700  SIX:   DB    0F0H
23800         DB    080H
23900         DB    080H
24000         DB    0F0H
24100         DB    090H
24200         DB    090H
24300         DB    0F0H
24400         DB    000H
24500  SEVEN: DB    0F0H
24600         DB    010H
24700         DB    020H
24800         DB    040H
24900         DB    040H
25000         DB    040H
25100         DB    040H
25200         DB    000H
25300  EIGHT: DB    0F0H
25400         DB    090H
25500         DB    090H
25600         DB    0F0H
25700         DB    090H
25800         DB    090H
25900         DB    0F0H
26000         DB    000H
26100  NINE:  DB    0F0H
```

```
26200            DB      090H
26300            DB      090H
26400            DB      0F0H
26500            DB      010H
26600            DB      010H
26700            DB      010H
26800            DB      000H
26900    ;
27000    ;
27100    ;               CO-ORDINATES OF ALPHA-NUMERICS
27200    ;
27300    ACX1    EQU     17H
27400    ACX2    EQU     17H
27500    ACY1    EQU     042H
27600    ACY2    EQU     054H
27700    ACY3    EQU     0AEH
27800    ACY4    EQU     0C0H
27900    ;
28000    AC0:    DB      ACX1
28100            DB      ACY1
28200    AC1:    DB      ACX1+10
28300            DB      ACY1
28400    AC2:    DB      BMPX
28500            DB      BMPY
28600    AC3:    DB      ACX1+30
28700            DB      ACY1
28800    AC4:    DB      ACX2
28900            DB      ACY2
29000    AC5:    DB      ACX2+10
29100            DB      ACY2
29200    AC6:    DB      ACX2+20
29300            DB      ACY2
29400    AC7:    DB      ACX2+30
29500            DB      ACY2
29600    AC8:    DB      ACX1
29700            DB      ACY3
29800    AC9:    DB      ACX1+10
29900            DB      ACY3
30000    AC10:   DB      ACX1+20
30100            DB      ACY3
30200    AC11:   DB      ACX1+30
30300            DB      ACY3
30400    AC12:   DB      ACX2
30500            DB      ACY4
30600    AC13:   DB      ACX2+10
30700            DB      ACY4
30800    AC14:   DB      ACX2+20
30900            DB      ACY4
31000    AC15:   DB      ACX2+30
31100            DB      ACY4
31200    BLNK:   DB      00H
31300            DB      00H
31400            DB      00H
31500            DB      00H
31600            DB      00H
31700            DB      00H
31800            DB      00H
31900            DB      00H
32000    PNBL:   DB      11000000B
32100            DB      11000000B
32200    BLLW:   DB      4
```

```
32300  BLLH:   DB   4
32400  GATE:   DB   0FFH
32500  GATEX:  DB   071H
32600  GATEY:  DB   096H
32700  GOX     EQU  4DH
32800  GOY     EQU  42H
32900  ;
33000  GAT1X:  DB   GOX
33100  GAT1Y:  DB   GOY
33200  GAT2X:  DB   GOX+24
33300  GAT2Y:  DB   GOY
33400  GAT3X:  DB   GOX+48
33500  GAT3Y:  DB   GOY
33600  GAT4X:  DB   GOX+72
33700  GAT4Y:  DB   GOY
33800  BALL:   DB   18H
33900          DB   3CH
34000          DB   7EH
34100          DB   0FFH
34200          DB   0FFH
34300          DB   7EH
34400          DB   3CH
34500          DB   18H
34600  LF1:    DB   LFCX
34700          DB   LFCY
34800          DB   LFCX+2
34900          DB   LFCY+2
35000          DB   LFCX+4
35100          DB   LFCY+4
35200          DB   LFCX+6
35300          DB   LFCY+6
35400          DB   LFCX+8
35500          DB   LFCY+8
35600          DB   LFCX+10
35700          DB   LFCY+10
35800          DB   LFCX
35900          DB   LFCY
36000          DB   LFCX
36100          DB   LFCY
36200  LF2:    DB   LFCX
36300          DB   LFCY
36400          DB   LFCX+2
36500          DB   LFCY+2
36600          DB   LFCX+4
36700          DB   LFCY+2
36800          DB   LFCX+6
36900          DB   LFCY+4
37000          DB   LFCX+8
37100          DB   LFCY+6
37200          DB   LFCX+10
37300          DB   LFCY+8
37400          DB   LFCX
37500          DB   LFCY
37600          DB   LFCX
37700          DB   LFCY
37800  LF3:    DB   LFCX
37900          DB   LFCY
38000          DB   LFCX+2
38100          DB   LFCY
38200          DB   LFCX+4
38300          DB   LFCY+2
```

```
38400        DB    LFCX+6
38500        DB    LFCY+4
38600        DB    LFCX+8
38700        DB    LFCY+4
38800        DB    LFCX+10
38900        DB    LFCY+6
39000        DB    LFCX
39100        DB    LFCY
39200        DB    LFCX
39300        DB    LFCY
39400  LF4:  DB    LFCX
39500        DB    LFCY
39600        DB    LFCX+2
39700        DB    LFCY
39800        DB    LFCX+4
39900        DB    LFCY+2
40000        DB    LFCX+6
40100        DB    LFCY+2
40200        DB    LFCX+8
40300        DB    LFCY+4
40400        DB    LFCX+10
40500        DB    LFCY+4
40600        DB    LFCX+12
40700        DB    LFCY+4
40800        DB    LFCX
40900        DB    LFCY
41000  LF5:  DB    LFCX
41100        DB    LFCY
41200        DB    LFCX+2
41300        DB    LFCY
41400        DB    LFCX+4
41500        DB    LFCY
41600        DB    LFCX+6
41700        DB    LFCY
41800        DB    LFCX+8
41900        DB    LFCY+2
42000        DB    LFCX+10
42100        DB    LFCY+2
42200        DB    LFCX+12
42300        DB    LFCY+2
42400        DB    LFCX
42500        DB    LFCY
42600  LF6:  DB    LFCX
42700        DB    LFCY
42800        DB    LFCX+2
42900        DB    LFCY
43000        DB    LFCX+4
43100        DB    LFCY
43200        DB    LFCX+6
43300        DB    LFCY
43400        DB    LFCX+8
43500        DB    LFCY
43600        DB    LFCX+10
43700        DB    LFCY
43800        DB    LFCX+12
43900        DB    LFCY
44000        DB    LFCX+14
44100        DB    LFCY
44200  LF7:  DB    LFCX
44300        DB    LFCY
44400        DB    LFCX+2
```

```
44500        DB    LFCY
44600        DB    LFCX+4
44700        DB    LFCY
44800        DB    LFCX+6
44900        DB    LFCY
45000        DB    LFCX+8
45100        DB    LFCY-2
45200        DB    LFCX+10
45300        DB    LFCY-2
45400        DB    LFCX+12
45500        DB    LFCY-2
45600        DB    LFCX
45700        DB    LFCY
45800  LF8:  DB    LFCX
45900        DB    LFCY
46000        DB    LFCX+2
46100        DB    LFCY
46200        DB    LFCX+4
46300        DB    LFCY-2
46400        DB    LFCX+6
46500        DB    LFCY-2
46600        DB    LFCX+8
46700        DB    LFCY-4
46800        DB    LFCX+10
46900        DB    LFCY-4
47000        DB    LFCX+12
47100        DB    LFCY-4
47200        DB    LFCX
47300        DB    LFCY
47400  LF9:  DB    LFCX
47500        DB    LFCY
47600        DB    LFCX+2
47700        DB    LFCY
47800        DB    LFCX+4
47900        DB    LFCY-2
48000        DB    LFCX+6
48100        DB    LFCY-4
48200        DB    LFCX+8
48300        DB    LFCY-4
48400        DB    LFCX+10
48500        DB    LFCY-6
48600        DB    LFCX
48700        DB    LFCY
48800        DB    LFCX
48900        DB    LFCY
49000  LF10: DB    LFCX
49100        DB    LFCY
49200        DB    LFCX+2
49300        DB    LFCY-2
49400        DB    LFCX+4
49500        DB    LFCY-2
49600        DB    LFCX+6
49700        DB    LFCY-4
49800        DB    LFCX+8
49900        DB    LFCY-6
50000        DB    LFCX+10
50100        DB    LFCY-8
50200        DB    LFCX
50300        DB    LFCY
50400        DB    LFCX
50500        DB    LFCY
```

```
50600  LF11:  DB   LFCX
50700         DB   LFCY
50800         DB   LFCX+2
50900         DB   LFCY-2
51000         DB   LFCX+4
51100         DB   LFCY-4
51200         DB   LFCX+6
51300         DB   LFCY-6
51400         DB   LFCX+8
51500         DB   LFCY-8
51600         DB   LFCX+10
51700         DB   LFCY-10
51800         DB   LFCX
51900         DB   LFCY
52000         DB   LFCX
52100         DB   LFCY
52200  RF1:   DB   RFCX
52300         DB   RFCY
52400         DB   RFCX-2
52500         DB   RFCY+2
52600         DB   RFCX-4
52700         DB   RFCY+4
52800         DB   RFCX-6
52900         DB   RFCY+6
53000         DB   RFCX-8
53100         DB   RFCY+8
53200         DB   RFCX-10
53300         DB   RFCY+10
53400         DB   RFCX
53500         DB   RFCY
53600         DB   RFCX
53700         DB   RFCY
53800  RF2:   DB   RFCX
53900         DB   RFCY
54000         DB   RFCX-2
54100         DB   RFCY+2
54200         DB   RFCX-4
54300         DB   RFCY+2
54400         DB   RFCX-6
54500         DB   RFCY+4
54600         DB   RFCX-8
54700         DB   RFCY+6
54800         DB   RFCX-10
54900         DB   RFCY+8
55000         DB   RFCX
55100         DB   RFCY
55200         DB   RFCX
55300         DB   RFCY
55400  RF3:   DB   RFCX
55500         DB   RFCY
55600         DB   RFCX-2
55700         DB   RFCY
55800         DB   RFCX-4
55900         DB   RFCY+2
56000         DB   RFCX-6
56100         DB   RFCY+4
56200         DB   RFCX-8
56300         DB   RFCY+4
56400         DB   RFCX-10
56500         DB   RFCY+6
56600         DB   RFCX
```

```
56700        DB    RFCY
56800        DB    RFCX
56900        DB    RFCY
57000  RF4:  DB    RFCX
57100        DB    RFCY
57200        DB    RFCX-2
57300        DB    RFCY
57400        DB    RFCX-4
57500        DB    RFCY+2
57600        DB    RFCX-6
57700        DB    RFCY+2
57800        DB    RFCX-8
57900        DB    RFCY+4
58000        DB    RFCX-10
58100        DB    RFCY+4
58200        DB    RFCX-12
58300        DB    RFCY+4
58400        DB    RFCX
58500        DB    RFCY
58600  RF5:  DB    RFCX
58700        DB    RFCY
58800        DB    RFCX-2
58900        DB    RFCY
59000        DB    RFCX-4
59100        DB    RFCY
59200        DB    RFCX-6
59300        DB    RFCY
59400        DB    RFCX-8
59500        DB    RFCY+2
59600        DB    RFCX-10
59700        DB    RFCY+2
59800        DB    RFCX-12
59900        DB    RFCY+2
60000        DB    RFCX
60100        DB    RFCY
60200  RF6:  DB    RFCX
60300        DB    RFCY
60400        DB    RFCX-2
60500        DB    RFCY
60600        DB    RFCX-4
60700        DB    RFCY
60800        DB    RFCX-6
60900        DB    RFCY
61000        DB    RFCX-8
61100        DB    RFCY
61200        DB    RFCX-10
61300        DB    RFCY
61400        DB    RFCX-12
61500        DB    RFCY
61600        DB    RFCX-14
61700        DB    RFCY
61800  RF7:  DB    RFCX
61900        DB    RFCY
62000        DB    RFCX-2
62100        DB    RFCY
62200        DB    RFCX-4
62300        DB    RFCY
62400        DB    RFCX-6
62500        DB    RFCY
62600        DB    RFCX-8
62700        DB    RFCY-2
```

```
62800           DB      RFCX-10
62900           DB      RFCY-2
63000           DB      RFCX-12
63100           DB      RFCY-2
63200           DB      RFCX
63300           DB      RFCY
63400   RF8:    DB      RFCX
63500           DB      RFCY
63600           DB      RFCX-2
63700           DB      RFCY
63800           DB      RFCX-4
63900           DB      RFCY-2
64000           DB      RFCX-6
64100           DB      RFCY-2
64200           DB      RFCX-8
64300           DB      RFCY-4
64400           DB      RFCX-10
64500           DB      RFCY-4
64600           DB      RFCX-12
64700           DB      RFCY-4
64800           DB      RFCX
64900           DB      RFCY
65000   RF9:    DB      RFCX
65100           DB      RFCY
65200           DB      RFCX-2
65300           DB      RFCY
65400           DB      RFCX-4
65500           DB      RFCY-2
65600           DB      RFCX-6
65700           DB      RFCY-4
65800           DB      RFCX-8
65900           DB      RFCY-4
66000           DB      RFCX-10
66100           DB      RFCY-6
66200           DB      RFCX
66300           DB      RFCY
66400           DB      RFCX
66500           DB      RFCY
66600   RF10:   DB      RFCX
66700           DB      RFCY
66800           DB      RFCX-2
66900           DB      RFCY-2
67000           DB      RFCX-4
67100           DB      RFCY-2
67200           DB      RFCX-6
67300           DB      RFCY-4
67400           DB      RFCX-8
67500           DB      RFCY-6
67600           DB      RFCX-10
67700           DB      RFCY-8
67800           DB      RFCX
67900           DB      RFCY
68000           DB      RFCX
68100           DB      RFCY
68200   RF11:   DB      RFCX
68300           DB      RFCY
68400           DB      RFCX-2
68500           DB      RFCY-2
68600           DB      RFCX-4
68700           DB      RFCY-4
68800           DB      RFCX-6
```

```
68900        DB      RFCY-6
69000        DB      RFCX-8
69100        DB      RFCY-8
69200        DB      RFCX-10
69300        DB      RFCY-10
69400        DB      RFCX
69500        DB      RFCY
69600        DB      RFCX
69700        DB      RFCY
00100   ;
00200   ;
00300   ;
00400   ;
00500   ;
00600   ;
00700   ;
00800                        ; HORIZONTAL COORDINATES FOR
00900                        ; BALL IN RACE.
01000 HBALL:  DB      HBL
01100        DB      HBL
01200        DB      HBL
01300        DB      HBL
01400        DB      HBL
01500        DB      HBL
01600        DB      HBL
01700        DB      HBL
01800        DB      HBL
01900        DB      HBL
02000        DB      HBL
02100        DB      HBL
02200        DB      HBL
02300        DB      HBL
02400        DB      HBL
02500        DB      HBL
02600        DB      HBL
02700        DB      HBL
02800        DB      HBL
02900        DB      HBL
03000        DB      HBL
03100        DB      HBL
03200        DB      HBL
03300        DB      HBL
03400        DB      HBL
03500        DB      HBL
03600        DB      HBL
03700        DB      HBL
03800        DB      HBL
03900        DB      HBL
04000        DB      HBL
04100        DB      HBL
04200        DB      HBL
04300        DB      HBL
04400        DB      HBL
04500        DB      HBL
04600        DB      HBL
04700        DB      HBL
04800        DB      HBL
04900        DB      HBL
05000        DB      HBL
05100        DB      HBL
05200        DB      HBL
```

```
05300    DB    HBL
05400    DB    HBL
05500    DB    HBL
05600    DB    HBL
05700    DB    HBL
05800    DB    HBL
05900    DB    HBL
06000    DB    HBL
06100    DB    HBL-2
06200    DB    HBL-2
06300    DB    HBL-2
06400    DB    HBL-2
06500    DB    HBL-4
06600    DB    HBL-4
06700    DB    HBL-4
06800    DB    HBL-6
06900    DB    HBL-6
07000    DB    HBL-8
07100    DB    HBL-8
07200    DB    HBL-10
07300    DB    HBL-10
07400    DB    HBL-12
07500    DB    HBL-14
07600    DB    HBL-16
07700    DB    HBL-16
07800    DB    HBL-18
07900    DB    HBL-20
08000    DB    HBL-22
08100    DB    HBL-24
08200    DB    HBL-26
08300    DB    HBL-28
08400    DB    HBL-30
08500    DB    HBL-32
08600    DB    HBL-34
08700    DB    HBL-36
08800    DB    HBL-38
08900    DB    HBL-40
09000    DB    HBL-42
09100    DB    HBL-44
09200    DB    HBL-46
09300    DB    HBL-48
09400    DB    HBL-50
09500    DB    HBL-52
09600    DB    HBL-54
09700    DB    HBL-56
09800    DB    HBL-58
09900    DB    HBL-60
10000    DB    HBL-62
10100    DB    HBL-64
10200    DB    HBL-66
10300    DB    HBL-68
10400    DB    HBL-70
10500    DB    HBL-72
10600    DB    HBL-74
10700    DB    HBL-76
10800    DB    HBL-78
10900    DB    HBL-80
11000    DB    HBL-82
11100    DB    HBL-84
11200    DB    HBL-86
11300    DB    HBL-88
```

| | | |
|---|---|---|
| 11400 | DB | HBL-90 |
| 11500 | DB | HBL-92 |
| 11600 | DB | HBL-94 |
| 11700 | DB | HBL-96 |
| 11800 | DB | HBL-98 |
| 11900 | DB | HBL-100 |
| 12000 | DB | HBL-102 |
| 12100 | DB | HBL-104 |
| 12200 | DB | HBL-106 |
| 12300 | DB | HBL-108 |
| 12400 | DB | HBL-110 |
| 12500 | DB | HBL-112 |
| 12600 | DB | HBL-114 |
| 12700 | DB | HBL-116 |
| 12800 | DB | HBL-118 |
| 12900 | DB | HBL-120 |
| 13000 | DB | HBL-122 |
| 13100 | DB | HBL-124 |
| 13200 | DB | HBL-126 |
| 13300 | DB | HBL-128 |
| 13400 | DB | HBL-130 |
| 13500 | DB | HBL-130 |
| 13600 | DB | HBL-132 |
| 13700 | DB | HBL-134 |
| 13800 | DB | HBL-134 |
| 13900 | DB | HBL-136 |
| 14000 | DB | HBL-136 |
| 14100 | DB | HBL-138 |
| 14200 | DB | HBL-138 |
| 14300 | DB | HBL-140 |
| 14400 | DB | HBL-140 |
| 14500 | DB | HBL-140 |
| 14600 | DB | HBL-140 |
| 14700 | DB | HBL-140 |
| 14800 | DB | HBL-142 |
| 14900 | DB | HBL-142 |
| 15000 | DB | HBL-142 |
| 15100 | DB | HBL-142 |
| 15200 | DB | HBL-144 |
| 15300 | DB | HBL-144 |
| 15400 | DB | HBL-144 |
| 15500 | DB | HBL-144 |
| 15600 | DB | HBL-144 |
| 15700 | DB | HBL-144 |
| 15800 | DB | HBL-146 |
| 15900 | | |
| 16000 | | ; |
| 16100 | | ; VERTICAL COORDINATES FOR |
| 16200 | | ; BALL IN RACE. |
| 16300 | VBALL: DB | VBL |
| 16400 | DB | VBL-2 |
| 16500 | DB | VBL-4 |
| 16600 | DB | VBL-6 |
| 16700 | DB | VBL-8 |
| 16800 | DB | VBL-10 |
| 16900 | DB | VBL-12 |
| 17000 | DB | VBL-14 |
| 17100 | DB | VBL-16 |
| 17200 | DB | VBL-18 |
| 17300 | DB | VBL-20 |
| 17400 | DB | VBL-22 |

| | | |
|---|---|---|
| 17500 | DB | VBL-24 |
| 17600 | DB | VBL-26 |
| 17700 | DB | VBL-28 |
| 17800 | DB | VBL-30 |
| 17900 | DB | VBL-32 |
| 18000 | DB | VBL-34 |
| 18100 | DB | VBL-36 |
| 18200 | DB | VBL-38 |
| 18300 | DB | VBL-40 |
| 18400 | DB | VBL-42 |
| 18500 | DB | VBL-44 |
| 18600 | DB | VBL-46 |
| 18700 | DB | VBL-48 |
| 18800 | DB | VBL-50 |
| 18900 | DB | VBL-52 |
| 19000 | DB | VBL-54 |
| 19100 | DB | VBL-56 |
| 19200 | DB | VBL-58 |
| 19300 | DB | VBL-60 |
| 19400 | DB | VBL-62 |
| 19500 | DB | VBL-64 |
| 19600 | DB | VBL-66 |
| 19700 | DB | VBL-68 |
| 19800 | DB | VBL-70 |
| 19900 | DB | VBL-72 |
| 20000 | DB | VBL-74 |
| 20100 | DB | VBL-76 |
| 20200 | DB | VBL-78 |
| 20300 | DB | VBL-80 |
| 20400 | DB | VBL-82 |
| 20500 | DB | VBL-84 |
| 20600 | DB | VBL-86 |
| 20700 | DB | VBL-88 |
| 20800 | DB | VBL-90 |
| 20900 | DB | VBL-92 |
| 21000 | DB | VBL-94 |
| 21100 | DB | VBL-96 |
| 21200 | DB | VBL-98 |
| 21300 | DB | VBL-100 |
| 21400 | DB | VBL-102 |
| 21500 | DB | VBL-104 |
| 21600 | DB | VBL-106 |
| 21700 | DB | VBL-108 |
| 21800 | DB | VBL-110 |
| 21900 | DB | VBL-112 |
| 22000 | DB | VBL-114 |
| 22100 | DB | VBL-116 |
| 22200 | DB | VBL-118 |
| 22300 | DB | VBL-120 |
| 22400 | DB | VBL-122 |
| 22500 | DB | VBL-124 |
| 22600 | DB | VBL-126 |
| 22700 | DB | VBL-128 |
| 22800 | DB | VBL-130 |
| 22900 | DB | VBL-132 |
| 23000 | DB | VBL-134 |
| 23100 | DB | VBL-136 |
| 23200 | DB | VBL-138 |
| 23300 | DB | VBL-140 |
| 23400 | DB | VBL-142 |
| 23500 | DB | VBL-144 |

| | | |
|---|---|---|
| 23600 | DB | VBL-144 |
| 23700 | DB | VBL-146 |
| 23800 | DB | VBL-148 |
| 23900 | DB | VBL-148 |
| 24000 | DB | VBL-150 |
| 24100 | DB | VBL-150 |
| 24200 | DB | VBL-152 |
| 24300 | DB | VBL-152 |
| 24400 | DB | VBL-154 |
| 24500 | DB | VBL-154 |
| 24600 | DB | VBL-154 |
| 24700 | DB | VBL-156 |
| 24800 | DB | VBL-156 |
| 24900 | DB | VBL-156 |
| 25000 | DB | VBL-158 |
| 25100 | DB | VBL-158 |
| 25200 | DB | VBL-158 |
| 25300 | DB | VBL-158 |
| 25400 | DB | VBL-158 |
| 25500 | DB | VBL-160 |
| 25600 | DB | VBL-160 |
| 25700 | DB | VBL-160 |
| 25800 | DB | VBL-160 |
| 25900 | DB | VBL-160 |
| 26000 | DB | VBL-160 |
| 26100 | DB | VBL-160 |
| 26200 | DB | VBL-158 |
| 26300 | DB | VBL-158 |
| 26400 | DB | VBL-158 |
| 26500 | DB | VBL-158 |
| 26600 | DB | VBL-158 |
| 26700 | DB | VBL-158 |
| 26800 | DB | VBL-156 |
| 26900 | DB | VBL-156 |
| 27000 | DB | VBL-156 |
| 27100 | DB | VBL-154 |
| 27200 | DB | VBL-154 |
| 27300 | DB | VBL-154 |
| 27400 | DB | VBL-152 |
| 27500 | DB | VBL-152 |
| 27600 | DB | VBL-150 |
| 27700 | DB | VBL-150 |
| 27800 | DB | VBL-148 |
| 27900 | DB | VBL-146 |
| 28000 | DB | VBL-146 |
| 28100 | DB | VBL-144 |
| 28200 | DB | VBL-142 |
| 28300 | DB | VBL-140 |
| 28400 | DB | VBL-138 |
| 28500 | DB | VBL-136 |
| 28600 | DB | VBL-134 |
| 28700 | DB | VBL-132 |
| 28800 | DB | VBL-130 |
| 28900 | DB | VBL-128 |
| 29000 | DB | VBL-126 |
| 29100 | DB | VBL-124 |
| 29200 | DB | VBL-122 |
| 29300 | DB | VBL-120 |
| 29400 | DB | VBL-118 |
| 29500 | DB | VBL-116 |
| 29600 | DB | VBL-114 |

```
29700           DB      VBL-112
29800           DB      VBL-110
29900           DB      VBL-108
30000           DB      VBL-106
30100           DB      VBL-104
30200           DB      VBL-102
30300           DB      VBL-100
30400           DB      VBL-98
30500           DB      VBL-96
30600           DB      VBL-94
30700           DB      VBL-92
30800           DB      VBL-90
30900           DB      VBL-88
31000           DB      VBL-86
31100           DB      VBL-84

00100   ;
00200   ;
00300   ;
00400   ;
00500   ;       RAM STORAGE
00600   ;
00700           ORG     9000H
00800   VEXIT:  DS      1
00900   TARGET: DS      1
01000   BFLAG:  DS      1
01100   STUB2:  DS      1
01200   FLIND:  DS      1
01300   FIELD:  DS      1
01400   I:      DS      1
01500   PBYTE1: DS      1
01600   PBYTE2: DS      1
01700   PBYTE3: DS      1
01800   CHAR1:  DS      1
01900   PBLLX:  DS      1
02000   PBLLY:  DS      1
02100   OBLLX:  DS      1
02200   OBLLY:  DS      1
02300   NBLLX:  DS      1
02400   NBLLY:  DS      1
02500   FPN:    DS      1
02600   OLFPN:  DS      1
02700   NLFPN:  DS      1
02800   ORFPN:  DS      1
02900   NRFPN:  DS      1
03000   LFON:   DS      1       ;LEFT FLIPPER ON
03100   LFOFF:  DS      1       ;LEFT FLIPPER OFF
03200   RFON:   DS      1       ;RIGHT FLIPPER ON
03300   RFOFF:  DS      1       ;RIGHT FLIPPER OFF
03400   LFSTP:  DS      1
03500   RFSTP:  DS      1
03600   FSTP:   DS      1
03700   XBLL1:  DS      1       ;BALL X POSITION, LSB
03800   XBLL2:  DS      1       ;  "         "   , MSB
03900   YBLL1:  DS      1       ;BALL Y POSITION, LSB
04000   YBLL2:  DS      1       ;  "         "   , MSB
04100   XINC1:  DS      1       ;BALL X VELOCITY, LSB
04200   XINC2:  DS      1       ;  "         "   , MSB
04300   YINC1:  DS      1       ;BALL Y VELOCITY, LSB
04400   YINC2:  DS      1       ;  "         "   , MSB
04500   GRAV:   DS      1       ;GRAVITY COUNTER
```

```
04600  COIN:   DS   1
04700  TGTX:   DS   1
04800  TGTY:   DS   1
04900  TRGTAX: DS   1
05000  TRGTAY: DS   1
05100  TGTH:   DS   1
05200  TGTW:   DS   1
05300  TX:     DS   1
05400  TY:     DS   1
05500  BUMPX:  DS   1
05600  BUMPY:  DS   1
05700  SASX:   DS   1   ; X AXES COMPRESSION FACTOR
05800  BX:     DS   1
05900  BY:     DS   1
06000  DSPFLG: DS   1   ;DISPLAY FLAG
06100  FFLAG:  DS   1
06200  GFLAG1: DS   1
06300  GFLAG2: DS   1
06400  DFLAG:  DS   1   ;DISPLAY TABLE FLAG
06500  WHIT:   DS   1
06600  RST55R: DS   2
06700  TXA:    DS   1
06800  TXB:    DS   1
06900  HITE:   DS   1
07000  WIDTH:  DS   1
07100  DATA:   DS   1
07200  TEMP1:  DS   2
07300  TEMP2:  DS   2
07400  MVTC2:  DS   1
07500  MVTC5:  DS   1
07600  MVTC6:  DS   1
07700  INDEX1: DS   1
07800  INDEX2: DS   1
07900  RFP:    DS   1   ;RIGHT FLIPPER POSITION
08000  LFP     DS   1   ;LEFT FLIPPER POSITION
08100  OX1:    DS   1
08200  OXINC:  DS   2
08300  OYINC:  DS   2
08400  RADX:   DS   1
08500  TEMP:   DS   1
08600  SOUND:  DS   1
08700  NSCOR:  DS   2
08800  GMOVR:  DS   1
08900  H:      DS   1
09000  SBIT:   DS   1
09100  SOUT:   DS   1
09200  COUNT:  DS   8
09300  ;
09400  AX:     DS   1
09500  A0:     DS   1
09600  A1:     DS   1
09700  A2:     DS   1
09800  A3:     DS   1
09900  A4:     DS   1
10000  A5:     DS   1
10100  A6:     DS   1
10200  A7:     DS   1
10300  A8:     DS   1
10400  A9:     DS   1
10500  A10:    DS   1
10600  A11:    DS   1
```

```
10700  A12:   DS    1
10800  A13:   DS    1
10900  A14:   DS    1
11000  A15:   DS    1
11100  BMPR:  DS    10
11200  ;            VTR IS A BUFFER AREA FOR STORAGE OF DATA FROM
11300  ;      THE USART TO THE BMPR TABLE.
11400  ;      THE FORMAT OF EACH BLOCK IN THE VTR TABLE IS:
11500  ;             BUMPER NUMBER
11600  ;             BUMPER TYPE
11700  ;             HORIZONTAL CO-ORDINATE
11800  ;             VERTICAL CO-ORDINATE
11900  VX:    DS    1              ;VTR INDEX
12000  VTRP:  DC    2
12100  VTR:   DS    12
12200  STACK: DS    60
12300  STACK2: DS   10
12400  STACK1: DS   1
00100  ;
00200  ;
00300  ;
00400  ;
00500  ;      PERIPHERALS
00600  ;
00700  ;      8156
00800  ;             CMND PORT = I/O 128
00900  ;             PA = I/O 129 ( PLUNGER - PA0, PA1, PA2, PA3)
01000  ;             PB = I/O 130
01100  ;             PC = I/O 131 (COINCIDENCE - PC0, PC1
01200  ;                           TEST - PC2
01300  ;                           START - PC3
01400  ;                           LEFT FLIPPER - PC5
01500  ;                           RIGHT FLIPPER - PC4      )
01600  ;      TX STATUS-A = I/O 208 , MEM D000H
01700  ;             B8 = R1         (WRITE ONLY)
01800  ;             B7 = R2
01900  ;             B6 = C1 BAR
02000  ;             B5 = BLOCK BAR
02100  ;             B4 = BLANK
02200  ;             B3 = LL
02300  ;             B2 = DI1
02400  ;             B1 = DI0
02500  ;             ADDRESS RESET = NOT C1 BAR AND NOT R2
02600  ;      TX STATUS-B = I/O 209, MEM D001H
02700  ;             B8 =            (WRITE ONLY)
02800  ;             B7 =
02900  ;             B6 = BL2
03000  ;             B5 = BL1
03100  ;             B4 = BL0
03200  ;             B3 = BW2
03300  ;             B2 = BW1
03400  ;             B1 = BW0
03500  ;
03600  ;
03700  ;                     B B B   LOW    HIGH
03800  ;                     W W W   RES    RES
03900  ;                     2 1 0   DIM    DIM
04000  ;                     -----   ---    ---
04100  ;
04200  ;                     0 0 0    -      1
04300  ;                     0 0 1    1      2
```

```
04400 ;                      0 1 0     2     4
04500 ;                      0 1 1     4     8
04600 ;                      1 0 0     8    16
04700 ;
04800 ;
04900 ;       TX STATUS-C = I/O 210, MEM D002H
05000 ;              B8 = B7           (WRITE ONLY)
05100 ;              B7 = B6
05200 ;              B6 = B5
05300 ;              B5 = B4
05400 ;              B4 = B3
05500 ;              B3 = B2
05600 ;              B2 = B1
05700 ;              B1 = B0
05800 ;                      0=BLANK
05900 ;                      1=PNBL
06000 ;                      2=GATE
06100 ;                      5=ZERO
06200 ;                      6=ONE
06300 ;                      7=TWO
06400 ;                      8=THREE
06500 ;                      9=FOUR
06600 ;                      10=FIVE
06700 ;                      11=SIX
06800 ;                      12=SEVEN
06900 ;                      13=EIGHT
07000 ;                      14=NINE
07100 ;
07200 ;       SOUND BYTE     I/O 211, MEM D003H
07300 ;              B8      WALL
07400 ;              B7
07500 ;              B6      FLIPPER
07600 ;              B5
07700 ;              B4      VIDEO TAPE BUMPER
07800 ;              B3      ACTIVE # BUMPER
07900 ;              B2      WIPE OUT BUMPER
08000 ;              B1      PLUNGER
08100 ;       USART = MEM C000,C001
08200 ;              I/O 192,193
08300 ;       HSTART = I/O 200, MEM C200 (WRITE ONLY)
08400 ;       VSTART = I/O 201, MEM C801 (WRITE ONLY)
08500 ;
08600 ;
08700          END
```

We claim:
1. An interactive video training and amusement system, comprising:
   a video playback source of video signals of a television format for providing both pictorial training or amusement information to be displayed on the screen of a cathode ray tube display and digital data pertaining to said pictorial training or amusement information, said digital data being related to said pictorial training or amusement information on a field-by-field basis and identifies position and/or the nature of a video object in the pictorial portion of the video signals;
   means for generating signals which when coupled to a cathode ray tube display will cause display thereon of symbols distinct from the pictorial training or amusement information provided by the video signals from the video playback source;
   means for receiving said digital data for providing an input to said means for generating signals for influencing the signals generated thereby so as to alter the display on the cathode ray tube display; and
   means for coupling said video playback source of video signals and said means for generating signals to a cathode ray tube display.

2. The system of claim 1, wherein said video playback unit is a video tape recorder.

3. The system of claim 1, wherein said video playback unit is a video disc player.

4. The system of claim 1, wherein said source of video signals is received from a television station.

5. The system of claim 1, wherein said source of video signals is received from a broadcast television station.

6. The system of claim 1, wherein said source of video signals is received from a cablecast television station.

7. The system of claim 1, wherein said digital data defines the location of at least one object defined by said pictorial training or amusement information and contained in the same field interval of the television format.

8. The system of claim 1, wherein said pictorial training or amusement information includes pictorial objects which interact with the symbols from said means for generating signals.

9. The system of claim 1, wherein said means for generating signals includes a video game generator.

10. The system of claim 1, wherein said means for generating signals includes a microprocessor.

11. The system of claim 1, wherein said means for generating signals includes a microprocessor-controlled video game generator.

12. The system of claim 1, wherein said receiving means includes means for ascertaining when certain pictorial information is located at substantially the same position in the television format as a symbol derived from said means for generating signals.

13. The system of claim 1, wherein said receiving means includes means for positioning a symbol generated by said means for generating signals on the screen of a cathode ray tube display.

14. The system of claim 13, having game means with said symbols generated by said means for generating signals including a moving symbol.

15. The system of claim 14, wherein said moving symbol is a ball and said symbols generated by said video playback source receiving a barrier.

16. The system of claim 15, wherein said receiving means includes means for moving said ball when it collides with said barrier.

17. An interactive video training and amusement system, comprising:
- a first source of signals which when coupled to a television receiver will occasion the display of pictorial training or amusement information on the screen thereof;
- a second source of signals recorded on a video playback medium, said signals including signals which when coupled to a television receiver will occasion display of pictorial training or amusement information on the screen thereof and digital data signals related to said recorded pictorial training or amusement information signals and identifying position and/or the nature of a video object in the pictorial portion of the signals, said pictorial training or amusement information being distinct from the pictorial training or amusement information provided by the first source of signals;
- means for coupling the digital data signals from said second source of signals to said first source of signals to cause a change in the signals generated by said first source; and
- means for coupling said first and second sources of signals to a television receiver.

18. The system of claim 17, wherein said first source of signals is a video game generator.

19. The system of claim 17, wherein said first source of signals is a computer.

20. The system of claim 17, wherein said second source of signals is a video tape recorder.

* * * * *